United States Patent
Mao et al.

(10) Patent No.: US 12,210,476 B2
(45) Date of Patent: Jan. 28, 2025

(54) DISAGGREGATED COMPUTE RESOURCES AND STORAGE RESOURCES IN A STORAGE SYSTEM

(71) Applicant: PURE STORAGE, INC., Mountain View, CA (US)

(72) Inventors: Yuhong Mao, Fremont, CA (US); Hari Kannan, Sunnyvale, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 641 days.

(21) Appl. No.: 15/653,285

(22) Filed: Jul. 18, 2017

(65) Prior Publication Data
US 2018/0024964 A1    Jan. 25, 2018

Related U.S. Application Data

(63) Continuation-in-part of application No. 15/213,447, filed on Jul. 19, 2016, now Pat. No. 11,706,895.

(51) Int. Cl.
*G06F 15/16*     (2006.01)
*G06F 1/3234*    (2019.01)
(Continued)

(52) U.S. Cl.
CPC .......... *G06F 15/161* (2013.01); *G06F 1/3268* (2013.01); *G06F 1/3287* (2013.01);
(Continued)

(58) Field of Classification Search
CPC .... G06F 15/161; G06F 1/3268; G06F 1/3287; G06F 3/0655; G06F 9/5016; G06F 12/0246; H04L 67/1097; H05K 7/1485
See application file for complete search history.

(56) References Cited

U.S. PATENT DOCUMENTS 5,390,327 A    2/1995   Lubbers et al.
5,479,653 A    12/1995  Jones
(Continued)

FOREIGN PATENT DOCUMENTS

EP    2164006    3/2010
EP    2256621    12/2010
(Continued)

OTHER PUBLICATIONS

Memory Controller < https://en.wikipedia.org/wiki/Memory_controller >, accessed Sep. 29, 2019.*

(Continued)

*Primary Examiner* — Idriss N Alrobaye
*Assistant Examiner* — Richard B Franklin

(57) ABSTRACT

A storage cluster with disaggregated compute resources and storage memory is provided. The storage cluster includes a plurality of blades coupled as the storage cluster, each of at least a subset of the plurality of blades having solid-state storage memory therein. The storage cluster includes a switch that direct network-connects a plurality of processors, as compute resources in the plurality of blades, and the solid-state storage memory in each of the at least a subset of the plurality of blades, wherein the compute resources and the solid-state storage memory are disaggregated in the storage cluster.

20 Claims, 26 Drawing Sheets

(51) Int. Cl.

| | | |
|---|---|---|
| *G06F 1/3287* | (2019.01) | |
| *G06F 3/06* | (2006.01) | |
| *G06F 9/50* | (2006.01) | |
| *G06F 11/10* | (2006.01) | |
| *G06F 12/02* | (2006.01) | |
| *H04L 67/1097* | (2022.01) | |
| *G06F 1/26* | (2006.01) | |
| *H04L 41/0893* | (2022.01) | |

(52) U.S. Cl.
CPC .......... *G06F 3/0655* (2013.01); *G06F 9/5016* (2013.01); *G06F 12/0246* (2013.01); *H04L 67/1097* (2013.01); *G06F 1/263* (2013.01); *G06F 3/0688* (2013.01); *G06F 11/1076* (2013.01); *H04L 41/0893* (2013.01); *Y02D 10/00* (2018.01)

(56) References Cited

U.S. PATENT DOCUMENTS

| | | |
|---|---|---|
| 5,649,093 A | 7/1997 | Hanko et al. |
| 6,275,898 B1 | 8/2001 | DeKoning |
| 6,535,417 B2 | 3/2003 | Tsuda |
| 6,643,748 B1 | 11/2003 | Wieland |
| 6,725,392 B1 | 4/2004 | Frey et al. |
| 6,836,816 B2 | 12/2004 | Kendall |
| 6,985,995 B2 | 1/2006 | Holland et al. |
| 7,032,125 B2 | 4/2006 | Holt et al. |
| 7,051,155 B2 | 5/2006 | Talagala et al. |
| 7,065,617 B2 | 6/2006 | Wang |
| 7,069,383 B2 | 6/2006 | Yamamoto et al. |
| 7,076,606 B2 | 7/2006 | Orsley |
| 7,107,480 B1 | 9/2006 | Moshayedi et al. |
| 7,159,150 B2 | 1/2007 | Kenchammana-Hosekote et al. |
| 7,162,575 B2 | 1/2007 | Dalal et al. |
| 7,164,608 B2 | 1/2007 | Lee |
| 7,334,156 B2 | 2/2008 | Land et al. |
| 7,370,220 B1 | 5/2008 | Nguyen et al. |
| 7,424,498 B1 | 9/2008 | Patterson |
| 7,424,592 B1 | 9/2008 | Karr |
| 7,444,532 B2 | 10/2008 | Masuyama et al. |
| 7,480,658 B2 | 1/2009 | Heinla et al. |
| 7,536,506 B2 | 5/2009 | Ashmore et al. |
| 7,558,859 B2 | 7/2009 | Kasiolas |
| 7,565,446 B2 | 7/2009 | Talagala et al. |
| 7,613,947 B1 | 11/2009 | Coatney |
| 7,681,104 B1 | 3/2010 | Sim-Tang et al. |
| 7,681,105 B1 | 3/2010 | Sim-Tang et al. |
| 7,730,258 B1 | 6/2010 | Smith |
| 7,743,276 B2 | 6/2010 | Jacobsen et al. |
| 7,757,038 B2 | 7/2010 | Kitahara |
| 7,778,960 B1 | 8/2010 | Chatterjee et al. |
| 7,814,272 B2 | 10/2010 | Barrall et al. |
| 7,814,273 B2 | 10/2010 | Barrall |
| 7,818,531 B2 | 10/2010 | Barrall |
| 7,827,351 B2 | 11/2010 | Suetsugu et al. |
| 7,827,439 B2 | 11/2010 | Matthew et al. |
| 7,870,105 B2 | 1/2011 | Arakawa et al. |
| 7,885,938 B1 | 2/2011 | Greene et al. |
| 7,886,111 B2 | 2/2011 | Klemm et al. |
| 7,908,448 B1 | 3/2011 | Chatterjee et al. |
| 7,916,538 B2 | 3/2011 | Jeon et al. |
| 7,941,697 B2 | 5/2011 | Mathew et al. |
| 7,958,303 B2 | 6/2011 | Shuster |
| 7,971,129 B2 | 6/2011 | Watson |
| 7,991,822 B2 | 8/2011 | Bish et al. |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,046,548 B1 | 10/2011 | Chatterjee et al. |
| 8,051,361 B2 | 11/2011 | Sim-Tang et al. |
| 8,051,362 B2 | 11/2011 | Li et al. |
| 8,082,393 B2 | 12/2011 | Galloway et al. |
| 8,086,634 B2 | 12/2011 | Mimatsu |
| 8,086,911 B1 | 12/2011 | Taylor |
| 8,090,837 B2 | 1/2012 | Shin et al. |
| 8,108,502 B2 | 1/2012 | Tabbara et al. |
| 8,117,388 B2 | 2/2012 | Jernigan, IV |
| 8,140,821 B1 | 3/2012 | Raizen et al. |
| 8,145,838 B1 | 3/2012 | Miller et al. |
| 8,145,840 B2 | 3/2012 | Koul et al. |
| 8,176,360 B2 | 5/2012 | Frost et al. |
| 8,180,855 B2 | 5/2012 | Aiello et al. |
| 8,200,922 B2 | 6/2012 | McKean et al. |
| 8,225,006 B1 | 7/2012 | Karamcheti |
| 8,239,618 B2 | 8/2012 | Kotzur et al. |
| 8,244,999 B1 | 8/2012 | Chatterjee et al. |
| 8,305,811 B2 | 11/2012 | Jeon |
| 8,315,999 B2 | 11/2012 | Chatley et al. |
| 8,327,080 B1 | 12/2012 | Der |
| 8,351,290 B1 | 1/2013 | Huang et al. |
| 8,375,146 B2 | 2/2013 | Sinclair |
| 8,397,016 B2 | 3/2013 | Talagala et al. |
| 8,402,152 B2 | 3/2013 | Duran |
| 8,412,880 B2 | 4/2013 | Leibowitz et al. |
| 8,423,739 B2 | 4/2013 | Ash et al. |
| 8,429,436 B2 | 4/2013 | Filingim et al. |
| 8,473,778 B2 | 6/2013 | Simitci |
| 8,479,037 B1 | 7/2013 | Chatterjee et al. |
| 8,498,967 B1 | 7/2013 | Chatterjee et al. |
| 8,522,073 B2 | 8/2013 | Cohen |
| 8,533,527 B2 | 9/2013 | Daikokuya et al. |
| 8,544,029 B2 | 9/2013 | Bakke et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |
| 8,627,138 B1 | 1/2014 | Clark |
| 8,660,131 B2 | 2/2014 | Vermunt et al. |
| 8,661,218 B1 | 2/2014 | Piszczek et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,713,405 B2 | 4/2014 | Healey et al. |
| 8,725,730 B2 | 5/2014 | Keeton et al. |
| 8,756,387 B2 | 6/2014 | Frost et al. |
| 8,762,793 B2 | 6/2014 | Grube et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,824,261 B1 | 9/2014 | Miller et al. |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,847 B2 | 10/2014 | Feng et al. |
| 8,862,928 B2 | 10/2014 | Xavier et al. |
| 8,868,825 B1 | 10/2014 | Hayes |
| 8,874,836 B1 | 10/2014 | Hayes |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,949,502 B2 | 2/2015 | Mcknight et al. |
| 8,959,110 B2 | 2/2015 | Smith et al. |
| 8,977,597 B2 | 3/2015 | Ganesh et al. |
| 9,003,144 B1 * | 4/2015 | Hayes ................. G06F 11/1435 711/111 |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu |
| 9,043,372 B2 | 5/2015 | Makkar et al. |
| 9,053,808 B2 | 6/2015 | Sprouse |
| 9,058,155 B2 | 6/2015 | Cepulis et al. |
| 9,081,613 B2 * | 7/2015 | Bieswanger ............... G06F 9/50 |

(56) References Cited

U.S. PATENT DOCUMENTS

| | | |
|---|---|---|
| 9,116,819 B2 | 8/2015 | Cope et al. |
| 9,117,536 B2 | 8/2015 | Yoon |
| 9,122,401 B2 | 9/2015 | Zaltsman et al. |
| 9,134,908 B2 | 9/2015 | Horn et al. |
| 9,153,337 B2 | 10/2015 | Sutardja |
| 9,189,650 B2 | 11/2015 | Jaye et al. |
| 9,201,733 B2 | 12/2015 | Verma |
| 9,207,876 B2 | 12/2015 | Shu et al. |
| 9,250,687 B1* | 2/2016 | Aswadhati ............ G06F 1/3225 |
| 9,251,066 B2 | 2/2016 | Colgrove et al. |
| 9,323,667 B2 | 4/2016 | Bennett |
| 9,323,681 B2 | 4/2016 | Apostolides et al. |
| 9,348,538 B2 | 5/2016 | Mallaiah et al. |
| 9,384,082 B1 | 7/2016 | Lee et al. |
| 9,390,019 B2 | 7/2016 | Patterson et al. |
| 9,405,478 B2 | 8/2016 | Koseki et al. |
| 9,432,541 B2 | 8/2016 | Ishida |
| 9,477,632 B2 | 10/2016 | Du |
| 9,552,299 B2 | 1/2017 | Stalzer |
| 9,645,761 B1* | 5/2017 | Ben Dayan ........... G06F 3/0604 |
| 9,818,478 B2 | 11/2017 | Chung et al. |
| 9,829,066 B2 | 11/2017 | Thomas |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0022148 A1* | 1/2008 | Barnea ................. G06F 9/4411 |
| | | 714/5.1 |
| 2008/0049276 A1* | 2/2008 | Abe ..................... G06F 3/0608 |
| | | 358/524 |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2011/0035540 A1* | 2/2011 | Fitzgerald ............ G06F 3/0688 |
| | | 711/E12.001 |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt |
| 2012/0066430 A1* | 3/2012 | Cooper ............... G06F 13/4022 |
| | | 710/316 |
| 2012/0079318 A1 | 3/2012 | Colgrove et al. |
| 2012/0110154 A1* | 5/2012 | Adlung ................ G06F 9/5077 |
| | | 709/223 |
| 2012/0110249 A1 | 5/2012 | Jeong et al. |
| 2012/0131253 A1 | 5/2012 | McKnight |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healy et al. |
| 2013/0151653 A1 | 6/2013 | Sawiki |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0335907 A1* | 12/2013 | Shaw .................... G06F 1/183 |
| | | 361/679.31 |
| 2013/0339314 A1 | 12/2013 | Carpenter et al. |
| 2013/0339635 A1 | 12/2013 | Amit et al. |
| 2013/0339818 A1 | 12/2013 | Baker et al. |
| 2014/0040535 A1 | 2/2014 | Lee |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0136880 A1 | 5/2014 | Shankar et al. |
| 2014/0181402 A1 | 6/2014 | White |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik |
| 2015/0103481 A1* | 4/2015 | Haywood ................ G11C 8/00 |
| | | 361/679.32 |
| 2015/0134824 A1 | 5/2015 | Mickens |
| 2015/0153800 A1 | 6/2015 | Lucas et al. |
| 2015/0180714 A1 | 6/2015 | Chunn |
| 2015/0280959 A1 | 10/2015 | Vincent |
| 2015/0378706 A1* | 12/2015 | Roese ...................... G06F 8/61 |
| | | 717/176 |
| 2017/0295108 A1* | 10/2017 | Mahindru ............. H04L 47/70 |

FOREIGN PATENT DOCUMENTS

| | | |
|---|---|---|
| WO | WO 02-13033 | 2/2002 |
| WO | WO 2008103569 | 8/2008 |
| WO | WO 2008157081 | 12/2008 |
| WO | WO 2013032825 | 7/2013 |

OTHER PUBLICATIONS

Hwang, Kai et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

Schmid, Patrick: "RAID Scaling Charts, Part 3:4-128 KB Stripes Compared", Tom's Hardware, Nov. 27, 2007 (http://www.tomshardware.com/reviews/RAID-SCALING-CHARTS.1735-4.html), See pp. 1-2.

(56) References Cited

OTHER PUBLICATIONS

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.
Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.
International Search Report and the Written Opinion of the International Searching Authority, PCT/US2015/018169, mailed May 15, 2015.
International Search Report and the Written Opinion of the International Searching Authority, PCT/US2015/034302, mailed Sep. 11, 2015.
International Search Report and the Written Opinion of the International Searching Authority, PCT/US2015/039135, mailed Sep. 18, 2015.
International Search Report and the Written Opinion of the International Searching Authority, PCT/US2015/039136, mailed Sep. 23, 2015.
International Search Report, PCT/US2015/039142, mailed Sep. 24, 2015.
International Search Report, PCT/US2015/034291, mailed Sep. 30, 2015.
International Search Report and the Written Opinion of the International Searching Authority, PCT/US2015/039137, mailed Oct. 1, 2015.
International Search Report, PCT/US2015/044370, mailed Dec. 15, 2015.
International Search Report amd the Written Opinion of the International Searching Authority, PCT/US2016/031039, mailed May 5, 2016.
International Search Report, PCT/US2016/014604, mailed May 19, 2016.
International Search Report, PCT/US2016/014361, mailed May 30, 2016.
International Search Report, PCT/US2016/014356, mailed Jun. 28, 2016.
International Search Report, PCT/US2016/014357, mailed Jun. 29, 2016.
International Seach Report and the Written Opinion of the International Searching Authority, PCT/US2016/016504, mailed Jul. 6, 2016.
International Seach Report and the Written Opinion of the International Searching Authority, PCT/US2016/024391, mailed Jul. 12, 2016.
International Seach Report and the Written Opinion of the International Searching Authority, PCT/US2016/026529, mailed Jul. 19, 2016.
International Seach Report and the Written Opinion of the International Searching Authority, PCT/US2016/023485, mailed Jul. 21, 2016.
International Seach Report and the Written Opinion of the International Searching Authority, PCT/US2016/033306, mailed Aug. 19, 2016.
International Seach Report and the Written Opinion of the International Searching Authority, PCT/US2016/047808, mailed Nov. 25, 2016.
Stalzer, Mark A., "FlashBlades: System Architecture and Applications," Proceedings of the 2nd Workshop on Architectures and Systems for Big Data, Association for Computing Machinery, New York, NY, 2012, pp. 10-14.
International Seach Report and the Written Opinion of the International Searching Authority, PCT/US2016/042147, mailed Nov. 30, 2016.

* cited by examiner

DISAGGREGATED COMPUTE RESOURCES AND STORAGE RESOURCES IN A STORAGE SYSTEM

BACKGROUND

Data storage needs continue to grow, as do capacities of storage systems. A scalable storage system architecture supports addition of memory, so that the storage system can grow in capacity to meet user needs. Yet, capacity is not the only factor to be considered in scalability. Communication delays among components in a storage system can worsen as more components are added in order to increase capacity. A fixed communication bandwidth can result in communication bottlenecks as added components increase the total number of communications for a given time span in a storage system. Communication delays are especially noticeable and can abruptly worsen when expanding from a single chassis to a multi-chassis storage system. Also, computing power can get strained as more memory is added to a storage system, contributing to lengthening data access times with storage system expansion. It is in this context that present embodiments for storage system scalability arise.

BRIEF DESCRIPTION OF THE DRAWINGS

The present disclosure is illustrated by way of example, and not by way of limitation, and can be more fully understood with reference to the following detailed description when considered in connection with the figures as described below.

DESCRIPTION OF EMBODIMENTS

Figure 1A:
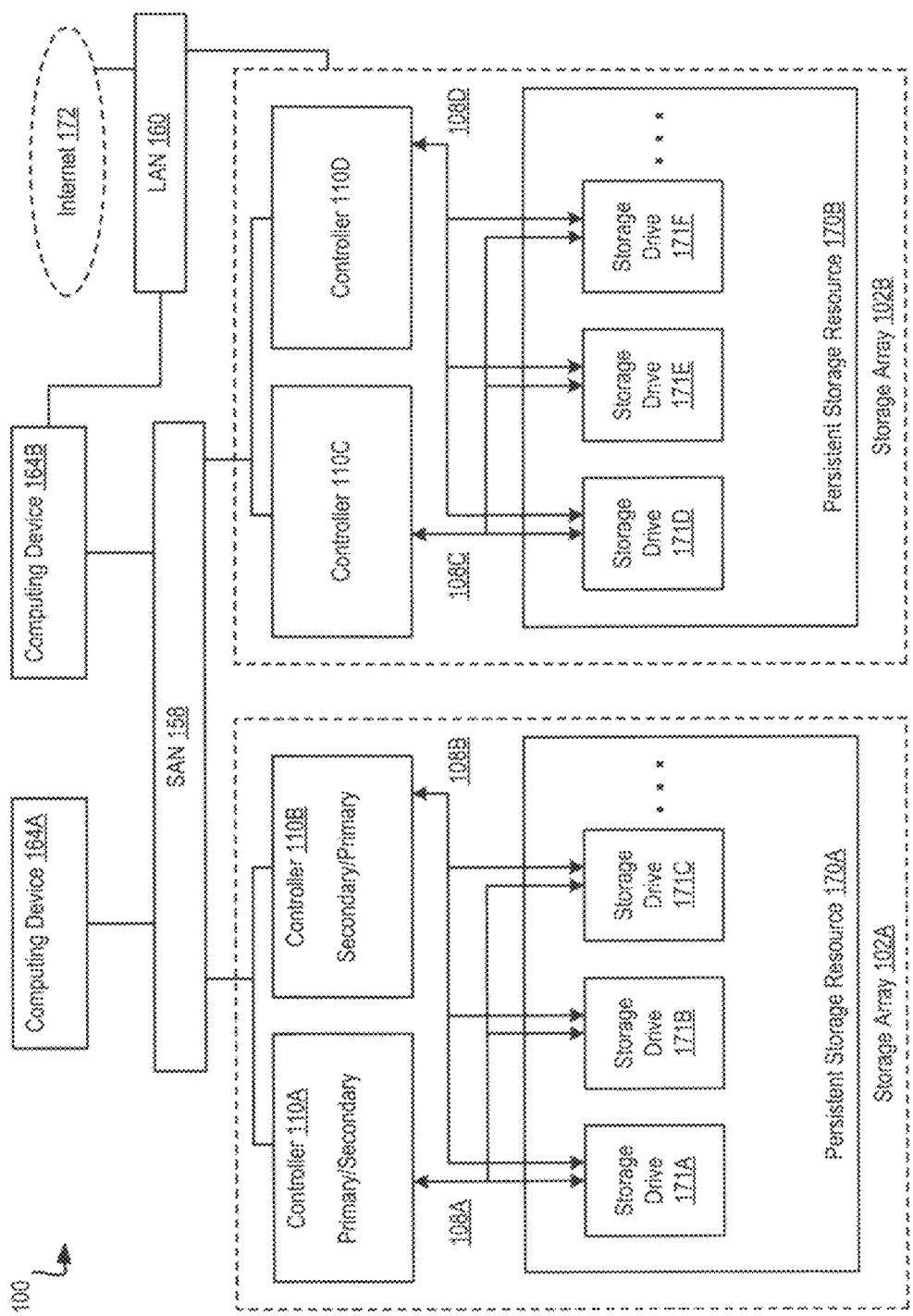
FIG. 1A illustrates a first example system for data storage in accordance with some implementations.

FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164. Computing devices (also referred to as "client devices" herein) may be for example, a server in a data center, a workstation, a personal computer, a notebook, or the like. Computing devices 164 are coupled for data communications to one or more storage arrays 102 through a storage area network (SAN) 158 or a local area network (LAN) 160.

The SAN 158 may be implemented with a variety of data communications fabrics, devices, and protocols. For example, the fabrics for SAN 158 may include Fibre Channel, Ethernet, Infiniband, Serial Attached Small Computer System Interface (SAS), or the like. Data communications protocols for use with SAN 158 may include Advanced Technology Attachment (ATA), Fibre Channel Protocol, Small Computer System Interface (SCSI), Internet Small Computer System Interface (iSCSI), HyperSCSI, Non-Volatile Memory Express (NVMe) over Fabrics, or the like. It may be noted that SAN 158 is provided for illustration, rather than limitation. Other data communication couplings may be implemented between computing devices 164 and storage arrays 102.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol (TCP), User Datagram Protocol (UDP), Internet Protocol (IP), Hyper-Text Transfer Protocol (HTTP), Wireless Access Protocol (WAP), Handheld Device Transport Protocol (HDTP), Session Initiation Protocol (SIP), Real Time Protocol (RTP), or the like.

Storage arrays 102 may provide persistent data storage for the computing devices 164. Storage array 102A may be contained in a chassis (not shown), and storage array 102B may be contained in another chassis (not shown), in implementations. Storage array 102A and 102B may include one or more storage array controllers 110 (also referred to as "controller" herein). A storage array controller 110 may be embodied as a module of automated computing machinery comprising computer hardware, computer software, or a combination of computer hardware and software. In some implementations, the storage array controllers 110 may be configured to carry out various storage tasks. Storage tasks may include writing data received from the computing devices 164 to storage array 102, erasing data from storage array 102, retrieving data from storage array 102 and providing data to computing devices 164, monitoring and reporting of disk utilization and performance, performing redundancy operations, such as Redundant Array of Independent Drives (RAID) or RAID-like data redundancy operations, compressing data, encrypting data, and so forth.

Storage array controller 110 may be implemented in a variety of ways, including as a Field Programmable Gate Array (FPGA), a Programmable Logic Chip (PLC), an Application Specific Integrated Circuit (ASIC), System-on-Chip (SOC), or any computing device that includes discrete components such as a processing device, central processing unit, computer memory, or various adapters. Storage array controller 110 may include, for example, a data communications adapter configured to support communications via the SAN 158 or LAN 160. In some implementations, storage array controller 110 may be independently coupled to the LAN 160. In implementations, storage array controller 110 may include an I/O controller or the like that couples the storage array controller 110 for data communications, through a midplane (not shown), to a persistent storage resource 170 (also referred to as a "storage resource" herein). The persistent storage resource 170 main include any number of storage drives 171 (also referred to as "storage devices" herein) and any number of non-volatile Random Access Memory (NVRAM) devices (not shown).

In some implementations, the NVRAM devices of a persistent storage resource 170 may be configured to receive, from the storage array controller 110, data to be stored in the storage drives 171. In some examples, the data may originate from computing devices 164. In some examples, writing data to the NVRAM device may be carried out more quickly than directly writing data to the storage drive 171. In implementations, the storage array controller 110 may be configured to utilize the NVRAM devices as a quickly accessible buffer for data destined to be written to the storage drives 171. Latency for write requests using NVRAM devices as a buffer may be improved relative to a system in which a storage array controller 110 writes data directly to the storage drives 171. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171.

In implementations, storage drive 171 may refer to any device configured to record data persistently, where "persistently" or "persistent" refers as to a device's ability to maintain recorded data after loss of power. In some implementations, storage drive 171 may correspond to non-disk storage media. For example, the storage drive 171 may be one or more solid-state drives (SSDs), flash memory based storage, any type of solid-state non-volatile memory, or any other type of non-mechanical storage device. In other implementations, storage drive 171 may include may include mechanical or spinning hard disk, such as hard-disk drives (HDD).

In some implementations, the storage array controllers 110 may be configured for offloading device management responsibilities from storage drive 171 in storage array 102. For example, storage array controllers 110 may manage control information that may describe the state of one or more memory blocks in the storage drives 171. The control information may indicate, for example, that a particular memory block has failed and should no longer be written to, that a particular memory block contains boot code for a storage array controller 110, the number of program-erase (P/E) cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171 may be stored in one or more particular memory blocks of the storage drives 171 that are selected by the storage array controller 110. The selected memory blocks may be tagged with an identifier indicating that the selected memory block contains control information. The identifier may be utilized by the storage array controllers 110 in conjunction with storage drives 171 to quickly identify the memory blocks that contain control information. For example, the storage controllers 110 may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171.

In implementations, storage array controllers 110 may offload device management responsibilities from storage drives 171 of storage array 102 by retrieving, from the storage drives 171, control information describing the state of one or more memory blocks in the storage drives 171. Retrieving the control information from the storage drives 171 may be carried out, for example, by the storage array controller 110 querying the storage drives 171 for the location of control information for a particular storage drive 171. The storage drives 171 may be configured to execute instructions that enable the storage drive 171 to identify the location of the control information. The instructions may be executed by a controller (not shown) associated with or otherwise located on the storage drive 171 and may cause the storage drive 171 to scan a portion of each memory block to identify the memory blocks that store control information for the storage drives 171. The storage drives 171 may respond by sending a response message to the storage array controller 110 that includes the location of control information for the storage drive 171. Responsive to receiving the response message, storage array controllers 110 may issue a request to read data stored at the address associated with the location of control information for the storage drives 171.

In other implementations, the storage array controllers 110 may further offload device management responsibilities from storage drives 171 by performing, in response to receiving the control information, a storage drive management operation. A storage drive management operation may include, for example, an operation that is typically performed by the storage drive 171 (e.g., the controller (not shown) associated with a particular storage drive 171). A storage drive management operation may include, for example, ensuring that data is not written to failed memory blocks within the storage drive 171, ensuring that data is written to memory blocks within the storage drive 171 in such a way that adequate wear leveling is achieved, and so forth.

In implementations, storage array 102 may implement two or more storage array controllers 110. For example, storage array 102A may include storage array controllers 110A and storage array controllers 110B. At a given instance, a single storage array controller 110 (e.g., storage array controller 110A) of a storage system 100 may be designated with primary status (also referred to as "primary controller" herein), and other storage array controllers 110 (e.g., storage array controller 110A) may be designated with secondary status (also referred to as "secondary controller" herein). The primary controller may have particular rights, such as permission to alter data in persistent storage resource 170 (e.g., writing data to persistent storage resource 170). At least some of the rights of the primary controller may supersede the rights of the secondary controller. For instance, the secondary controller may not have permission to alter data in persistent storage resource 170 when the primary controller has the right. The status of storage array controllers 110 may change. For example, storage array controller 110A may be designated with secondary status, and storage array controller 110B may be designated with primary status.

In some implementations, a primary controller, such as storage array controller 110A, may serve as the primary controller for one or more storage arrays 102, and a second controller, such as storage array controller 110B, may serve as the secondary controller for the one or more storage arrays 102. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171. It may be noted that in some implementations storage processing modules may be used to increase the number of storage drives controlled by the primary and secondary controllers.

In implementations, storage array controllers 110 are communicatively coupled, via a midplane (not shown), to one or more storage drives 171 and to one or more NVRAM devices (not shown) that are included as part of a storage array 102. The storage array controllers 110 may be coupled to the midplane via one or more data communication links and the midplane may be coupled to the storage drives 171 and the NVRAM devices via one or more data communications links. The data communications links described herein are collectively illustrated by data communications links 108 and may include a Peripheral Component Interconnect Express (PCIe) bus, for example.

Figure 1B:
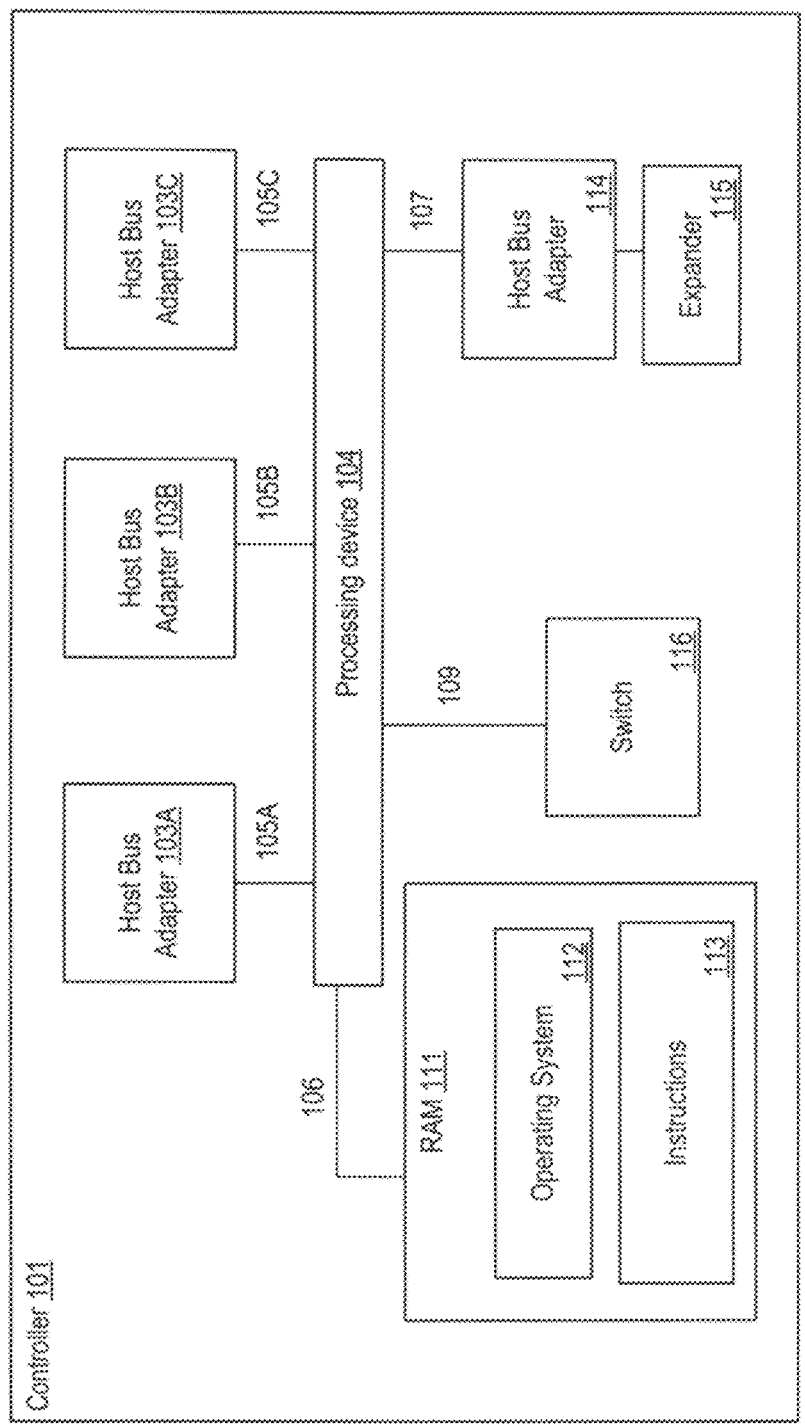
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110 described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory (RAM)

111. Processing device 104 (or controller 101) represents one or more general-purpose processing devices such as a microprocessor, central processing unit, or the like. More particularly, the processing device 104 (or controller 101) may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 104 (or controller 101) may also be one or more special-purpose processing devices such as an application specific integrated circuit (ASIC), a field programmable gate array (FPGA), a digital signal processor (DSP), network processor, or the like.

The processing device 104 may be connected to the RAM 111 via a data communications link 106, which may be embodied as a high speed memory bus such as a Double-Data Rate 4 (DDR4) bus. Stored in RAM 111 is an operating system 112. In some implementations, instructions 113 are stored in RAM 111. Instructions 113 may include computer program instructions for performing operations in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103 that are coupled to the processing device 104 via a data communications link 105. In implementations, host bus adapters 103 may be computer hardware that connects a host system (e.g., the storage array controller) to other network and storage arrays. In some examples, host bus adapters 103 may be a Fibre Channel adapter that enables the storage array controller 101 to connect to a SAN, an Ethernet adapter that enables the storage array controller 101 to connect to a LAN, or the like. Host bus adapters 103 may be coupled to the processing device 104 via a data communications link 105 such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
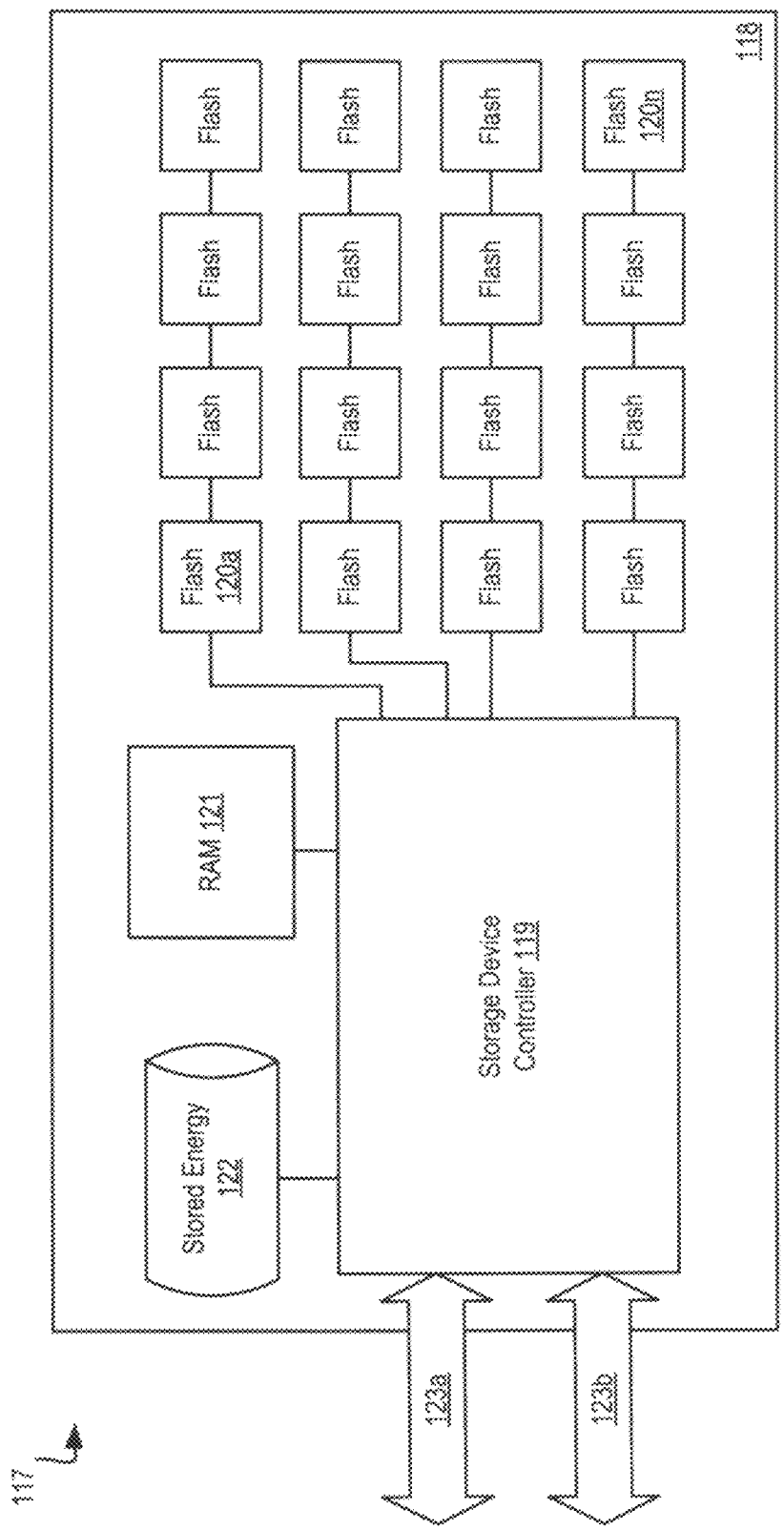
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect (PCI) flash storage device 118 with separately addressable fast write storage. System 117 may include a storage controller 119. In one embodiment, storage controller 119 may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119 as an addressable collection of Flash pages, erase blocks, and/or control elements sufficient to allow the storage device controller 119 to program and retrieve various aspects of the Flash. In one embodiment, storage device controller 119 may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include random access memory (RAM) 121 to store separately addressable fast-write data. In one embodiment, RAM 121 may be one or more separate discrete devices. In another embodiment, RAM 121 may be integrated into storage device controller 119 or multiple storage device controllers. The RAM 121 may be utilized for other purposes as well, such as temporary program memory for a processing device (E.g., a central processing unit (CPU)) in the storage device controller 119.

In one embodiment, system 119 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119 may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiBand, etc.). Data communications links 123a, 123b may be based on non-volatile memory express (NVMe) or NCMe over fabrics (NVMf) specifications that allow external connection to the storage device controller 119 from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119 may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119 may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 107a-120n stored energy device 122 may power storage device controller 119 and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
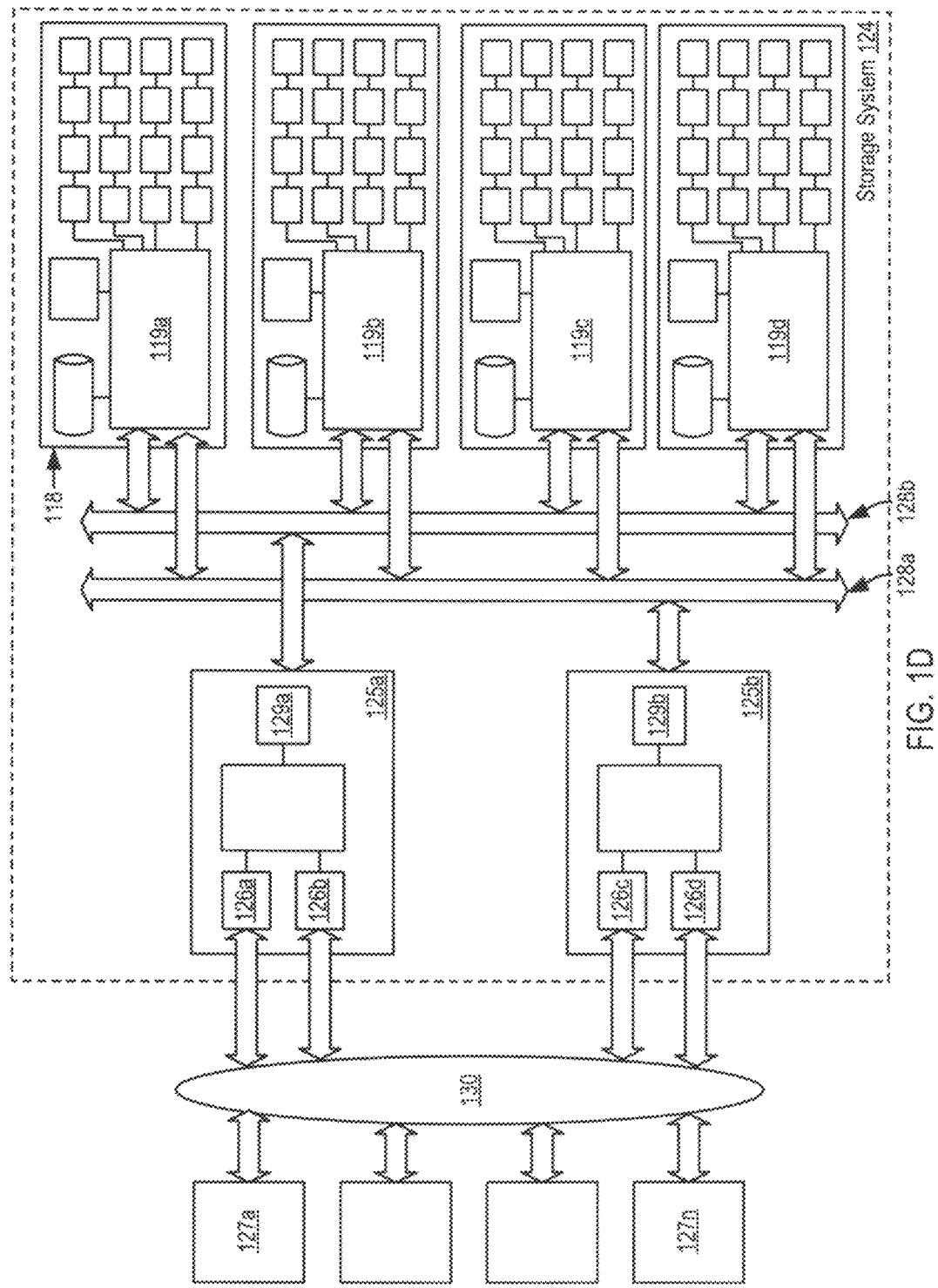
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a small computer system interface (SCSI) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128*a* and 128*b* may be based on other communications standards (e.g., HyperTransport, InfiBand, etc.). Other storage system embodiments may operate storage controllers 125*a*, 125*b* as multi-masters for both PCI buses 128*a*, 128*b*. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119*a* may be operable under direction from a storage controller 125*a* to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128*a*, 128*b*) from the storage controllers 125*a*, 125*b*. In one embodiment, a recalculation may include compressing data, attaching indexing or other metadata, combining multiple data segments together, performing erasure code calculations, etc.

In one embodiment, under direction from a storage controller 125*a*, 125*b*, a storage device controller 119*a*, 119*b* may be operable to calculate and transfer data to other storage devices from data stored in RAM (e.g., RAM 121 of FIG. 1C) without involvement of the storage controllers 125*a*, 125*b*. This operation may be used to mirror data stored in one controller 125*a* to another controller 125*b*, or it could be used to offload compression, data aggregation, and/or erasure coding calculations and transfers to storage devices to reduce load on storage controllers or the storage controller interface 129*a*, 129*b* to the PCI bus 128*a*, 128*b*.

A storage device controller 119 may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125*a*, 125*b* may initiate the use of erase blocks within and across storage devices (e.g., 118) in accordance with an age and expected remaining lifespan of the storage devices, or based on other statistics. The storage controllers 125*a*, 125*b* may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a MAC (media access control) address, but the storage cluster is presented to an external network as having a single cluster IP (Internet Protocol) address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
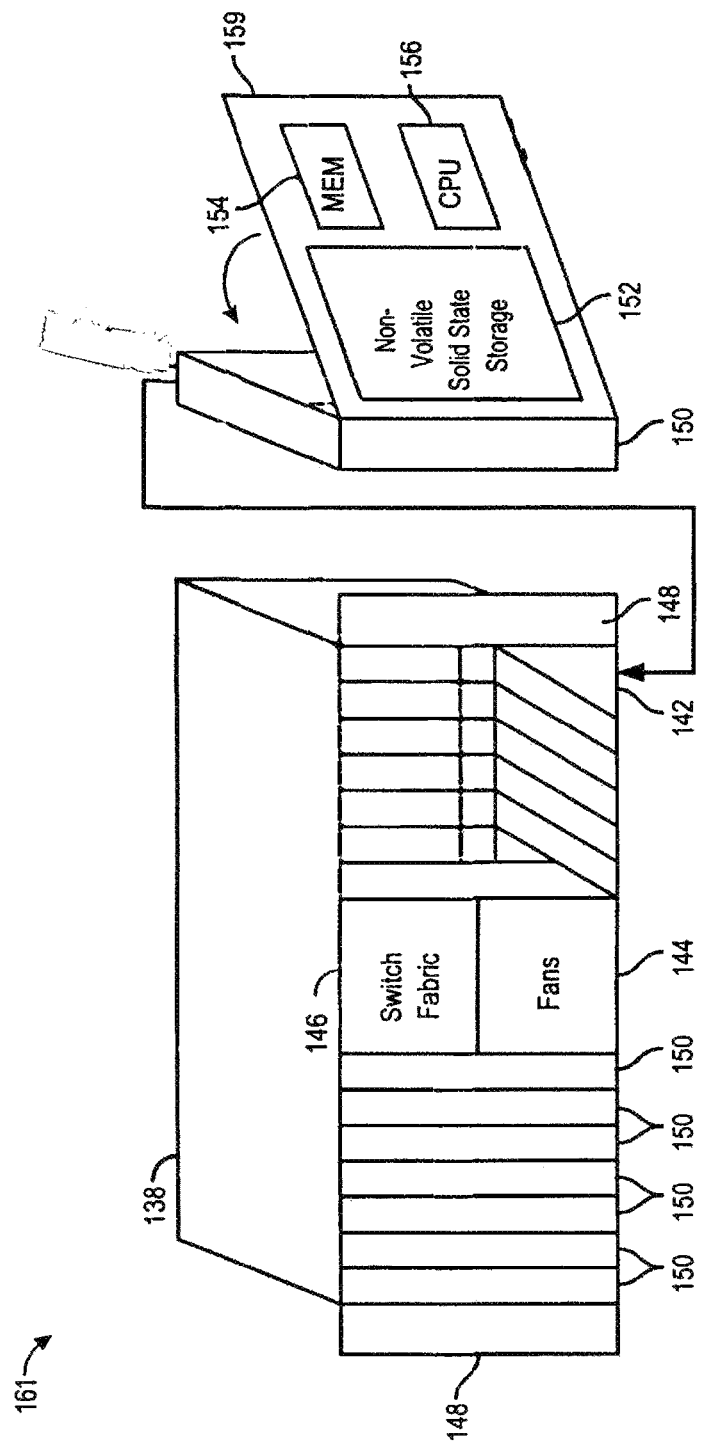
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
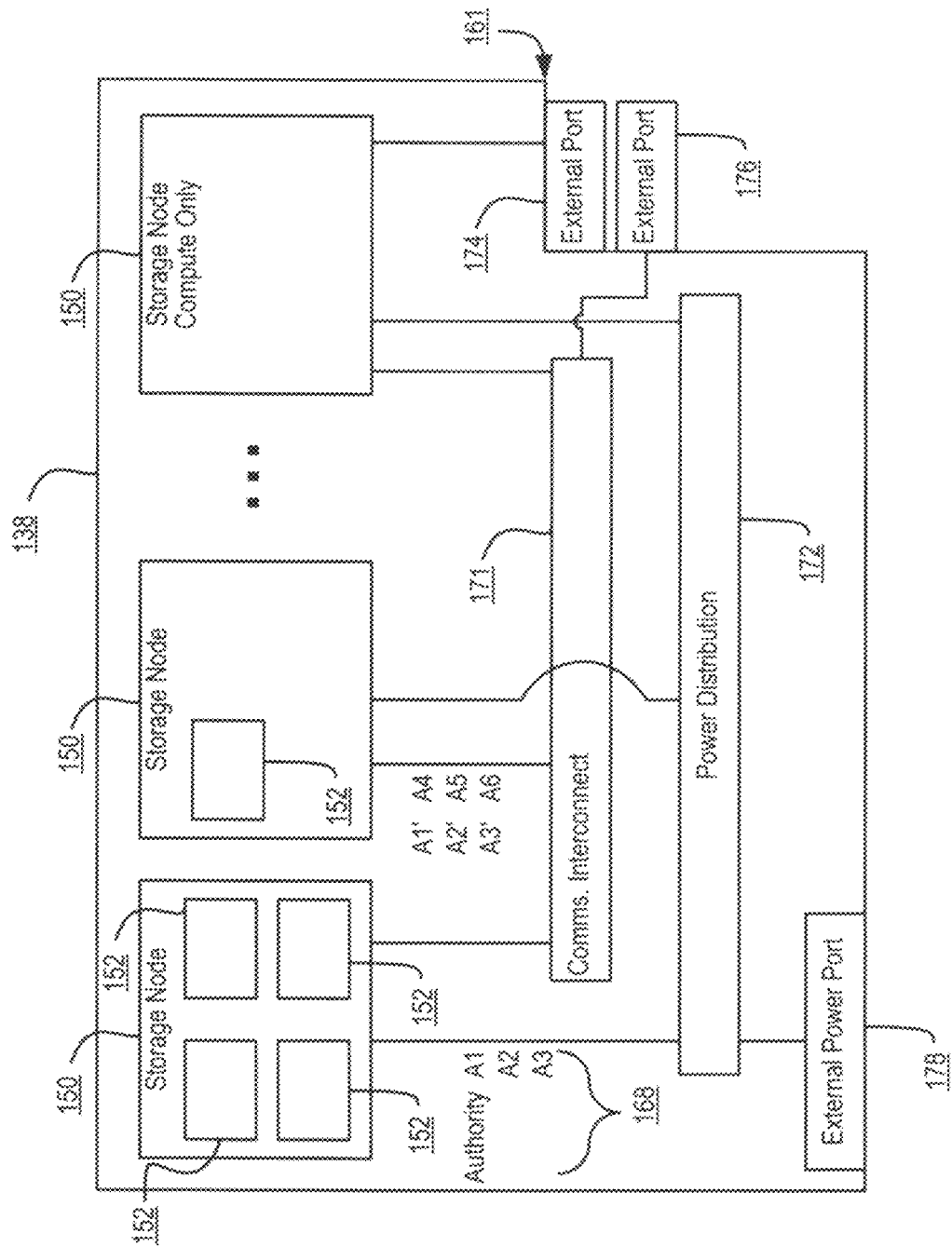
FIG. 2B is a block diagram showing an interconnect switch coupling multiple storage nodes in accordance with some embodiments.

FIG. 2B is a block diagram showing a communications interconnect 171 and power distribution bus 172 coupling multiple storage nodes 150. Referring back to FIG. 2A, the communications interconnect 171 can be included in or implemented with the switch fabric 146 in some embodiments. Where multiple storage clusters 161 occupy a rack, the communications interconnect 171 can be included in or implemented with a top of rack switch, in some embodiments. As illustrated in FIG. 2B, storage cluster 161 is enclosed within a single chassis 138. External port 176 is coupled to storage nodes 150 through communications interconnect 171, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
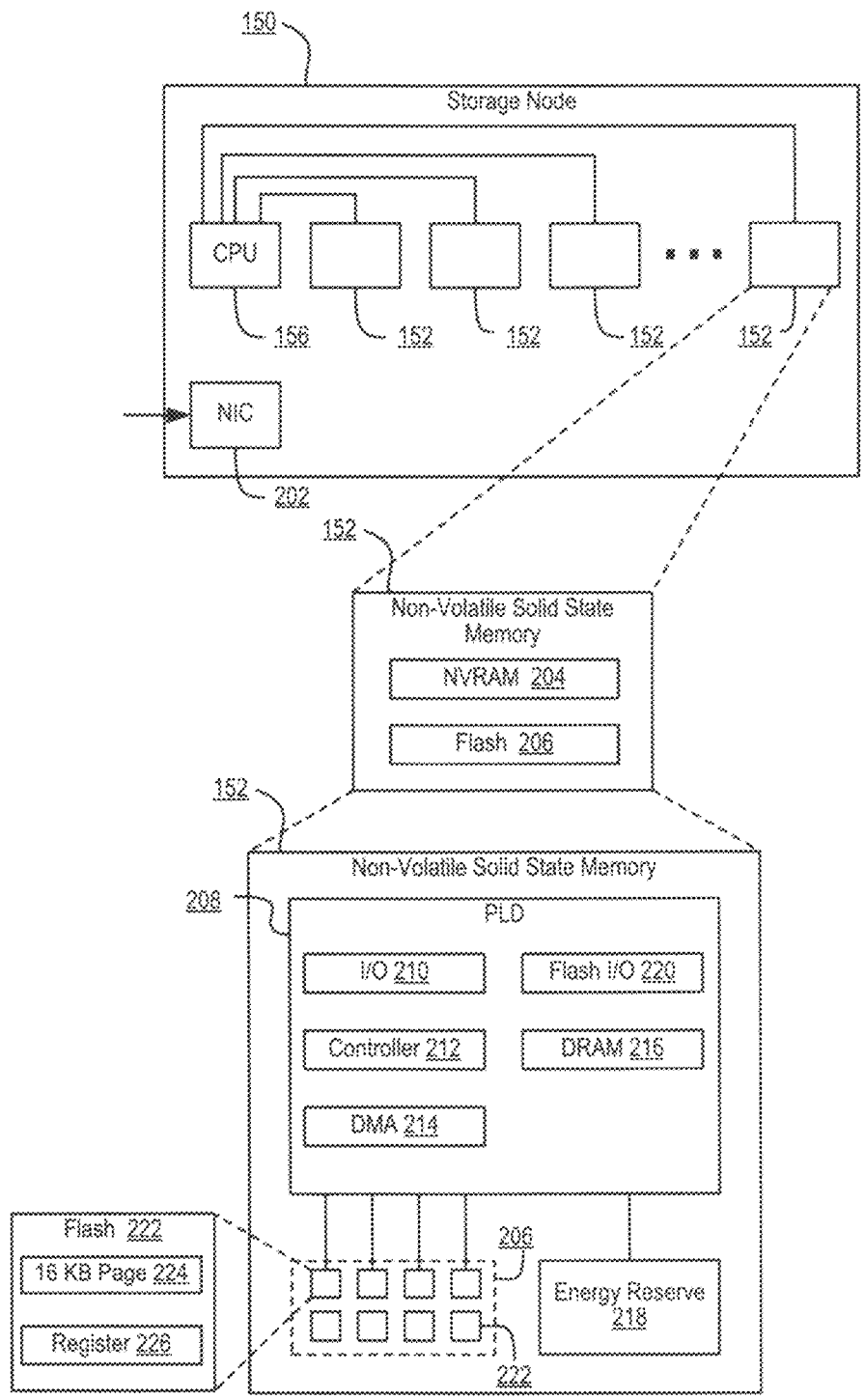
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
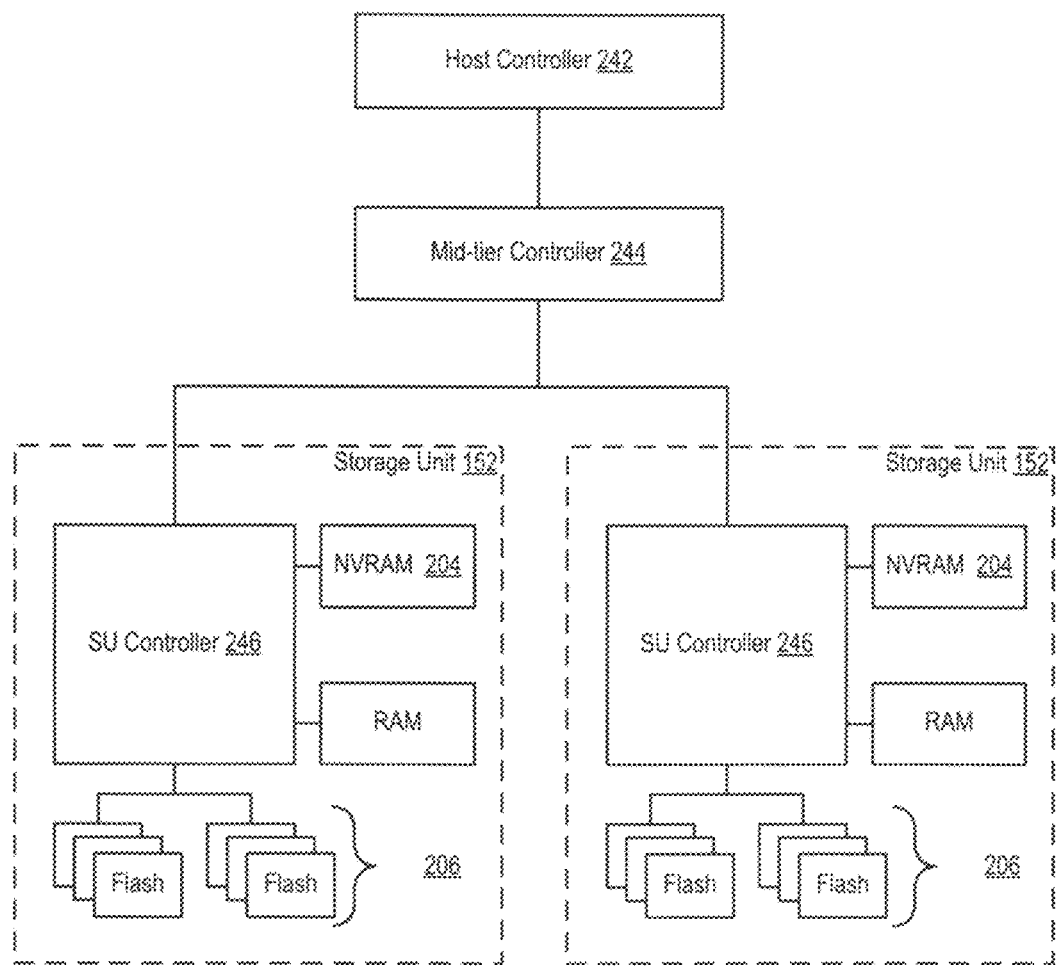
FIG. 2D shows a storage server environment, which uses embodiments of the storage nodes and storage units of FIGS. 1-3 in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
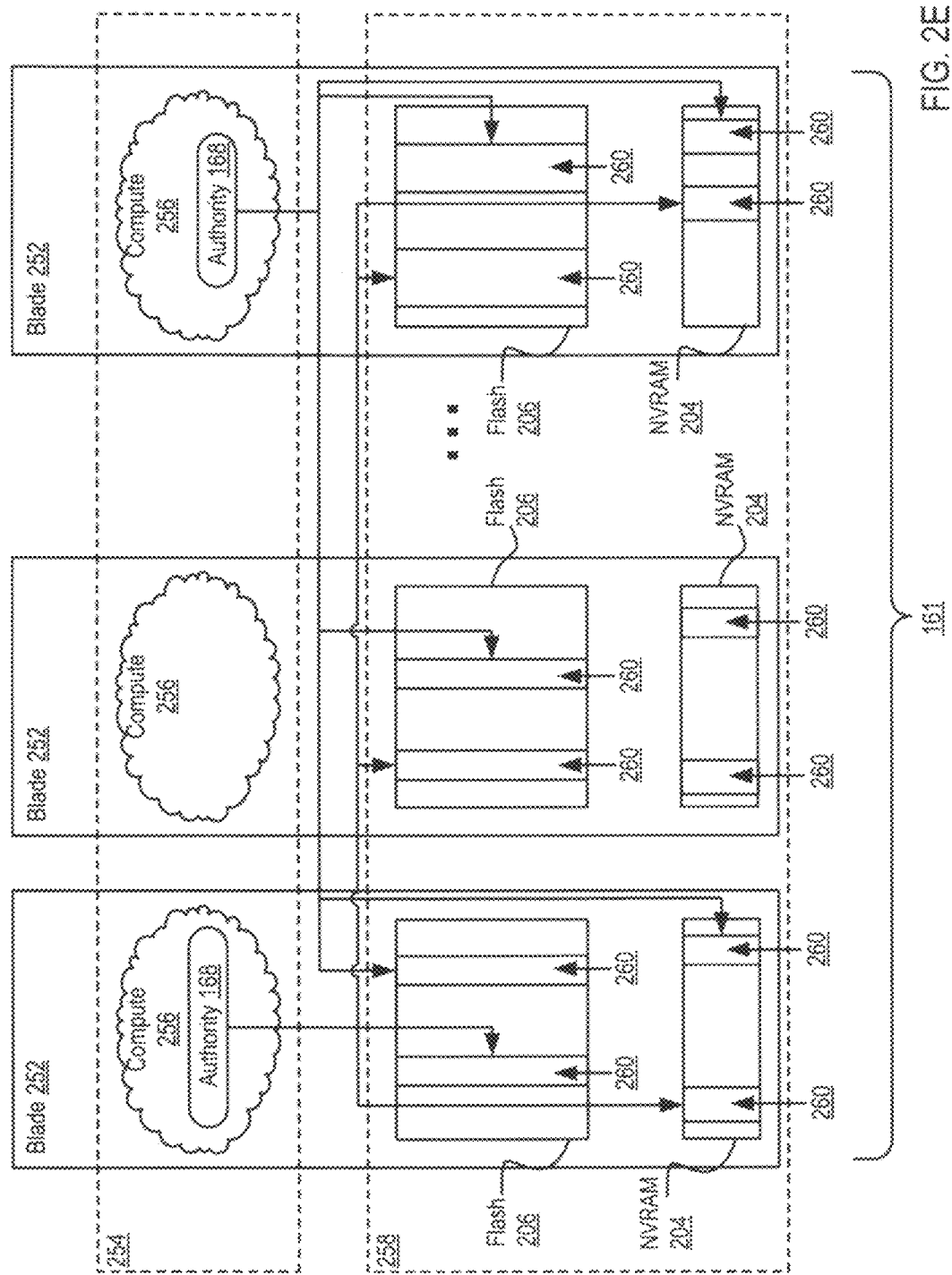
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
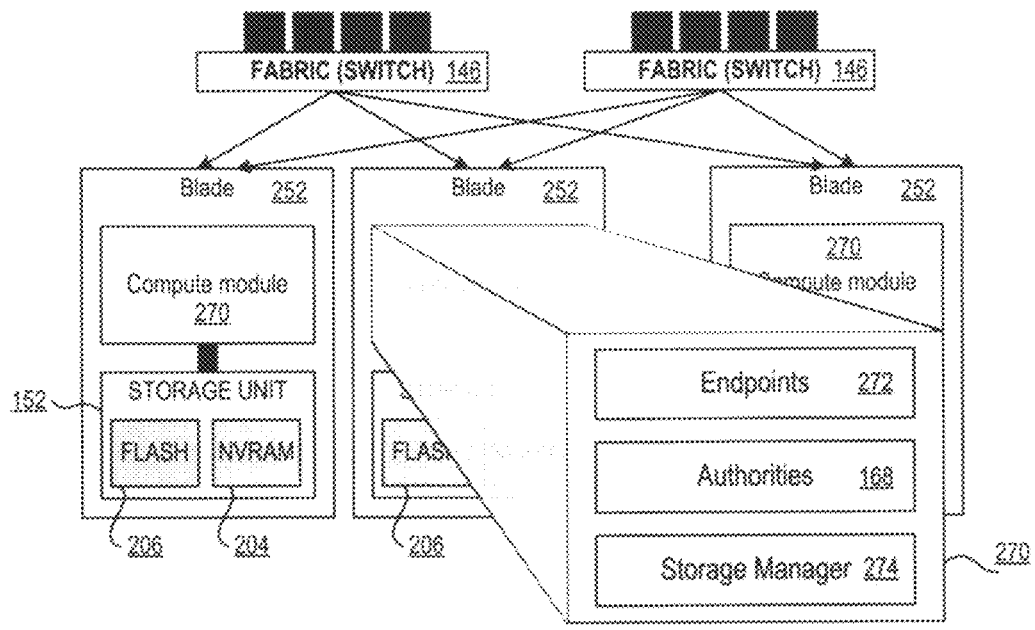
FIG. 2F depicts elasticity software layers in blades of a storage cluster, in accordance with some embodiments.

FIG. 2F depicts elasticity software layers in blades 252 of a storage cluster 161, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 168 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster 161, the system automatically rebalances load by:

Partitioning the new blade's 252 storage for use by the system's authorities 168, Migrating selected authorities 168 to the new blade 252, Starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
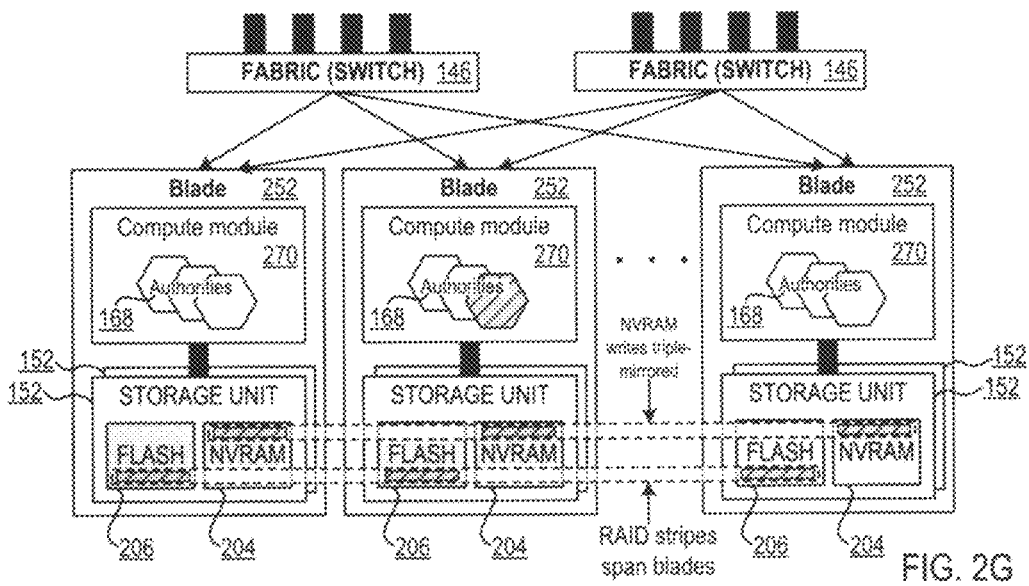
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager (NLM) is utilized as a facility that works in cooperation with the Network File System (NFS) to provide a System V style of advisory file and record locking over a network. The Server Message Block (SMB) protocol, one version of which is also known as Common Internet File System (CIFS), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list (ACL). The ACL is a list of permissions attached to an object and the ACL specifies which users or system processes are granted access to objects, as well as what operations are allowed on given objects. The systems may utilize Internet Protocol version 6 (IPv6), as well as IPv4, for the communications protocol that provides an identification and location system for computers on networks and routes traffic across the Internet. The routing of packets between networked systems may include Equal-cost multi-path routing (ECMP), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
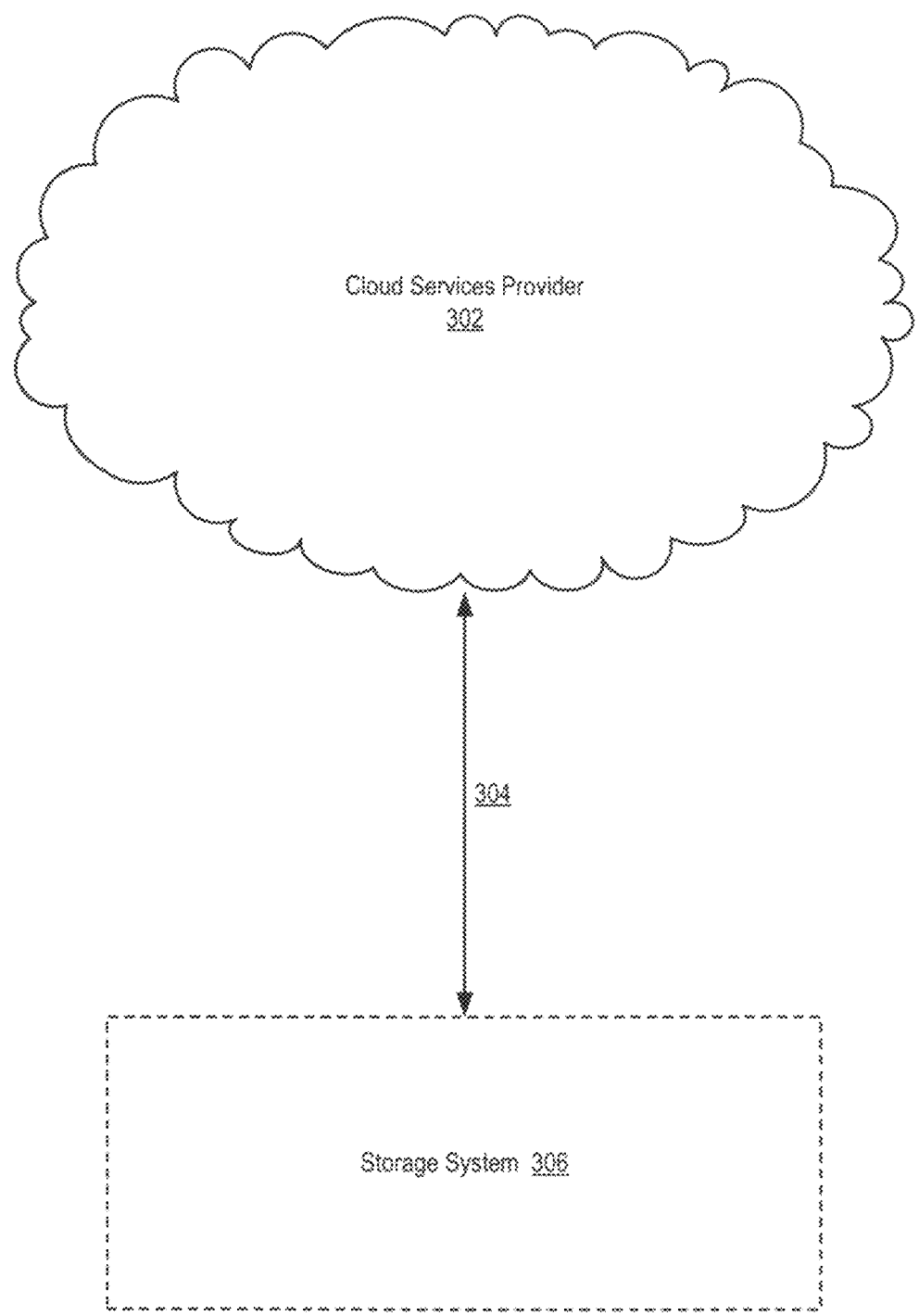
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
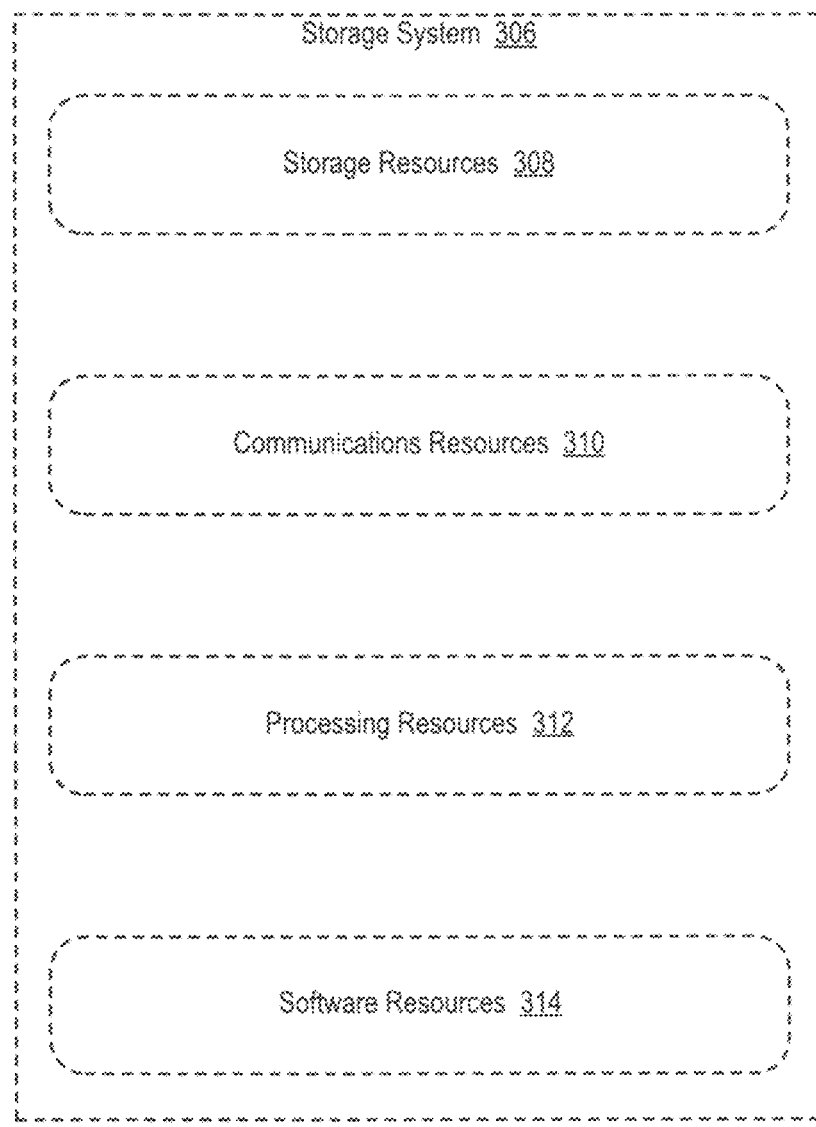
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint non-volatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach, or in other ways.

Readers will appreciate that the storage system 306 depicted in FIG. 3B may be useful for supporting various types of software applications. For example, the storage system 306 may be useful in supporting artificial intelligence applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, and many other types of applications by providing storage resources to such applications.

The present disclosure relates to independent scaling of compute resources and storage resources in a storage system. Storage systems described herein may include a plurality of blades. Each of the blades in the storage system may be embodied, for example, as a computing device that includes one or more computer processors, dynamic random access memory ('DRAM'), flash memory, interfaces for one more communication busses, interfaces for one or more power distribution busses, cooling components, one or more chassis, a switch, and so on. Although the blades will be described in more detail below, readers will appreciate that the blades may be embodied as different types of blades, such that the collective set of blades include heterogeneous members.

Each of the blades in the storage system may be mounted within one of a plurality of chassis. Each chassis may be embodied, for example, as physical structure that helps protect and organize components within the storage system. Each chassis may include a plurality of slots, where each slot is configured to receive a blade. Each chassis may also include one or more mechanisms such as a power distribution bus that is utilized to provide power to each blade that is mounted within the chassis, one or more data communication mechanisms such as a data communication bus that enables communication between each blade that is mounted within the chassis, one or more data communication mechanisms such as a data communication bus that enables communication between each blade that is mounted within and an external data communications network, and so on. In fact, each chassis may include at least two instances of both the power distribution mechanism and the communication mechanisms, where each instance of the power distribution mechanism and each instance of the communication mechanisms may be enabled or disabled independently.

As mentioned above, the present disclosure relates to independent scaling of compute resources and storage resources. Compute resources may be scaled independently of storage resources, for example, by altering the amount of compute resources that are provided by the storage system without changing the amount of storage resources that are provided by the storage system or by changing the amount of storage resources that are provided by the storage system without changing the amount of compute resources that are provided by the storage system. Compute resources and storage resources may be independently scaled, for example, by adding blades that only include storage resources, by adding blades that only include compute resources, by enabling compute resources on a blade to be powered up or powered down with no impact to the storage resources in the storage system, by enabling storage resources on a blade to be powered up or powered down with no impact to the compute resources in the storage system, and so on. As such, embodiments of the present disclosure will be described that include hardware support for independent scaling of compute resources and storage resources, software support for independent scaling of compute resources and storage resources, or any combination thereof.

Figure 4:
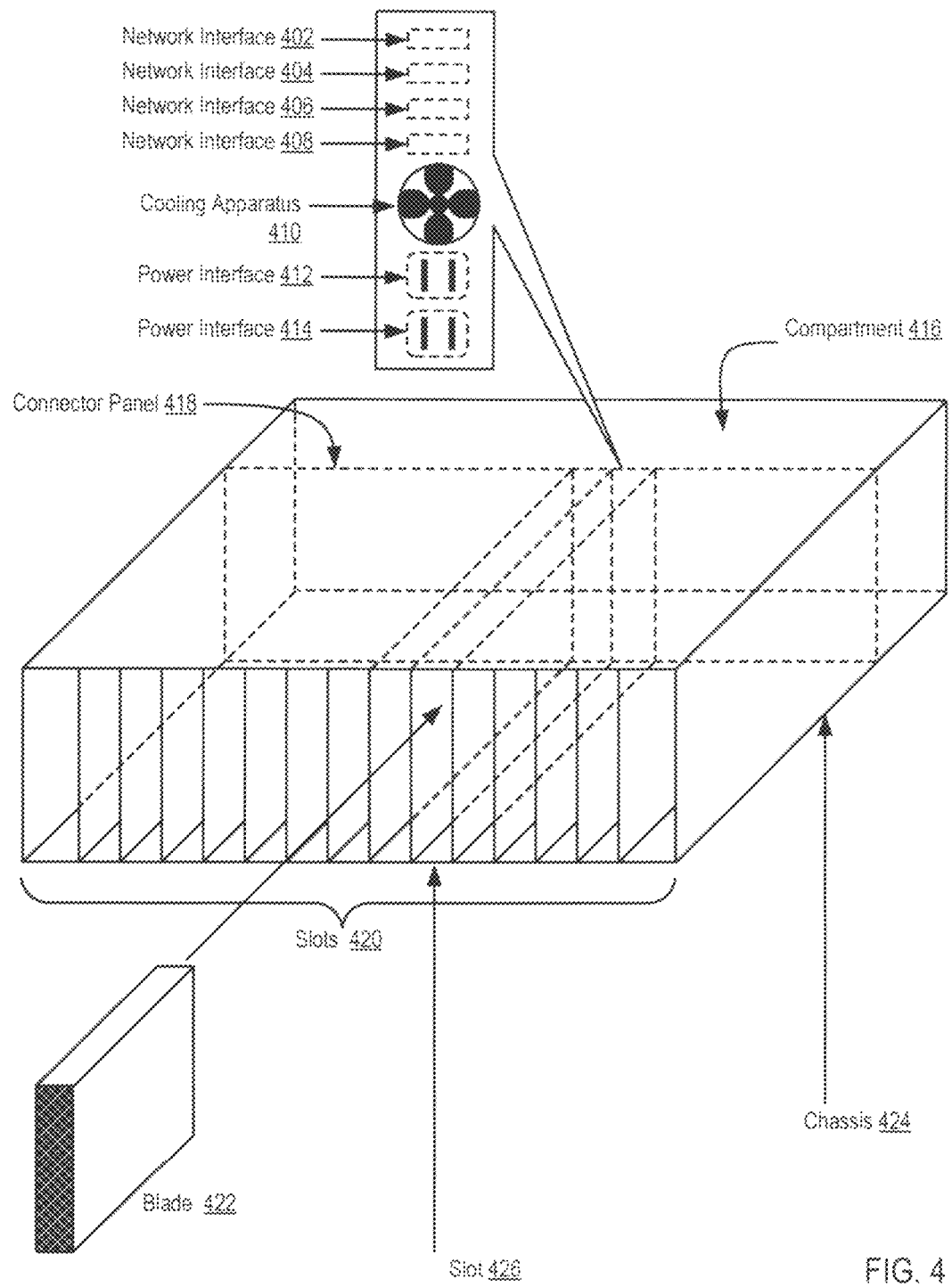
FIG. 4 sets forth a diagram of a chassis for use in a storage system that supports independent scaling of compute resources and storage resources according to embodiments of the present disclosure.

Example apparatuses and storage systems that support independent scaling of compute resources and storage resources in accordance with the present disclosure are described with reference to the accompanying drawings, beginning with FIG. 4. FIG. 4 sets forth a diagram of a chassis (424) for use in a storage system that supports independent scaling of compute resources and storage resources. The chassis (424) depicted in FIG. 4 may be embodied, for example, as an enclosure that may be mounted within a larger enclosure (e.g., a rack) to form a multi-chassis storage system. The chassis (424) depicted in FIG. 4 may include a plurality of slots (420) where each slot is configured to receive a blade (422). Although not depicted in the example of FIG. 4, readers will appreciate that each slot may include various support structures such as rails, locking mechanisms, and other physical components for securing a blade (422) within a particular slot. Furthermore, in alternative embodiments, a single blade may span multiple slots.

The blade (422) depicted in FIG. 4 may be embodied, for example, as a computing device that includes one or more computer processors, dynamic random access memory ('DRAM'), flash memory, interfaces for one more communication busses, interfaces for one or more power distribution busses, cooling components, and so on. Although blades will be described in more detail below, readers will appreciate that the chassis (424) may be configured to support different types of blades, such that the collective set of blades may include heterogeneous members. Blades may be of different types as some blades may only provide processing resources to the overall storage system, some blades may only provide storage resources to the overall storage system, and some blades may provide both processing resources and storage resources to the overall storage system. Furthermore, even the blades that are identical in type may be different in terms of the amount of storage resources that the blades provide to the overall storage system. For example, a first blade that only provides storage resources to the overall storage system may provide 8 TB of storage while a second blade that only provides storage resources to the overall storage system may provide 256 TB of storage. The blades that are identical in type may also be different in terms of the amount of processing resources that the blades provide to the overall storage system. For example, a first blade that only provides processing resources to the overall storage system may include more processors or more powerful processors than a second blade that only provides processing resources to the overall storage system. Readers will appreciate that other differences may also exist between two individual blades and that blade uniformity is not required according to embodiments described herein.

The chassis (424) depicted in FIG. 4 may also include a compartment (416) that is used to house computing devices and computing components that are utilized by the blades that are mounted within the chassis (424). The compartment (416) may include, for example, one or more power supplies that are used to provide power to one or more blades mounted within the chassis (424), one or more power busses that are used to deliver power from one or more power supplies to one or more blades mounted within the chassis (424), one or more network switches that are used to route data communications between blades mounted within the chassis (424), one or more network switches that are used to route data communications between blades mounted within the chassis (424) and a data communications network that is external to the chassis (424), one or more data communications busses, and so on. Readers will appreciate that additional computing devices and computing components may be mounted within the compartment (416) according to embodiments of the present disclosure.

The chassis (424) depicted in FIG. 4 may also include a connector panel (418) that is used to support various interfaces and connectors that allow components within the blades that are mounted within the chassis (424) to couple to computing devices and computing components that are housed in the compartment (416). The connector panel (418) may be used to provide various interfaces and connectors to each blade (422), as each slot may have a unique set of interfaces and connectors mounted on the connector panel (418), such that a blade that is mounted within a particular slot may couple to the unique set of interfaces and connectors mounted on the connector panel (418) when the blade is inserted into the particular slot. In the example depicted in FIG. 4, four network interfaces (402, 404, 406, 408) are mounted on the connector panel (418) for use by the blade (422) depicted in FIG. 4 when the blade (422) is inserted into a slot (426). The four network interfaces (402, 404, 406, 408) may be embodied, for example, as an RJ45 connector that is coupled to an Ethernet cable and inserted into an Ethernet port on the blade (422), as a 9-pin DE-9 cable connector that is coupled to an optical fiber cable and inserted into a Fibre Channel port on the blade (422), as a cooper or optical Quad Small Form-factor Pluggable ('QSFP') for Ethernet, InfiniBand, or other high speed signaling interface, as other interfaces that enable an Ethernet adapter in the blade (422) to be coupled to a data communications network, as other interfaces that enable a Fibre Channel adapter in the blade (422) to be coupled to a data communications network, as other interfaces that enable other types of host bus adapters in the blade (422) to be coupled to a data communications network, and so on. Readers will appreciate that each of the four network interfaces (402, 404, 406, 408) may be used to couple the blade (422) to distinct data communications networks, two or more of the network interfaces (402, 404, 406, 408) may be used to couple the blade (422) to the same data communications networks, one or more of the network interfaces (402, 404, 406, 408) may be used to couple the blade (422) to other blades or computing devices for point-to-point communications with the blade (422), and so on.

In the example depicted in FIG. 4, two power interfaces are also mounted on the connector panel (418) for use by the blade (422) depicted in FIG. 4 when the blade (422) is inserted into a slot (426). The power interfaces (412, 414) may be embodied, for example, as an interface to a power bus that is coupled to a power supply for delivering power to one or more of the blades in the chassis (424). Readers will appreciate that each power interface (412, 414) may be coupled to an independently controlled power domain, such that enabling or disabling the delivery of power to the blade (422) via the first power interface (412) has no impact on the delivery of power to the blade (422) via the second power interface (414), and vice versa. Readers will appreciate that some components within the blade (422) may be configured to receive power via the first power interface (412) while other components within the blade (422) may be configured to receive power via the second power interface (414), so that the delivery of power to different components within the blade (422) may be independently controlled. For example, compute resources within the blade (422) may receive power via the first power interface (412) while storage resources within the blade (422) may receive power via the second power interface (414).

In the example depicted in FIG. 4, a cooling apparatus (410) is also mounted on the connector panel (418). The cooling apparatus (410) may be embodied, for example, as a fan that is configured to deliver air flow to the blade (422) when the blade is inserted into the slot (426). Readers will appreciate that the connector panel (418) may include other interfaces not depicted here, different numbers of interfaces than are depicted here, and so on. Readers will further appreciate that while a connector panel (418) is one possible way to enable the blades that are mounted within the chassis (424) to couple to computing devices and computing components that are housed in the compartment (416), chassis for use in storage systems according to embodiments of the present disclosure can utilize other mechanisms to enable the blades that are mounted within the chassis (424) to couple to computing devices and computing components that are housed in the compartment (416). Furthermore, such computing devices and computing components do not have to be contained within a distinct compartment (416), as chassis (424) for use in storage systems according to embodiments of the present disclosure may be embodied in other ways.

Figure 5:
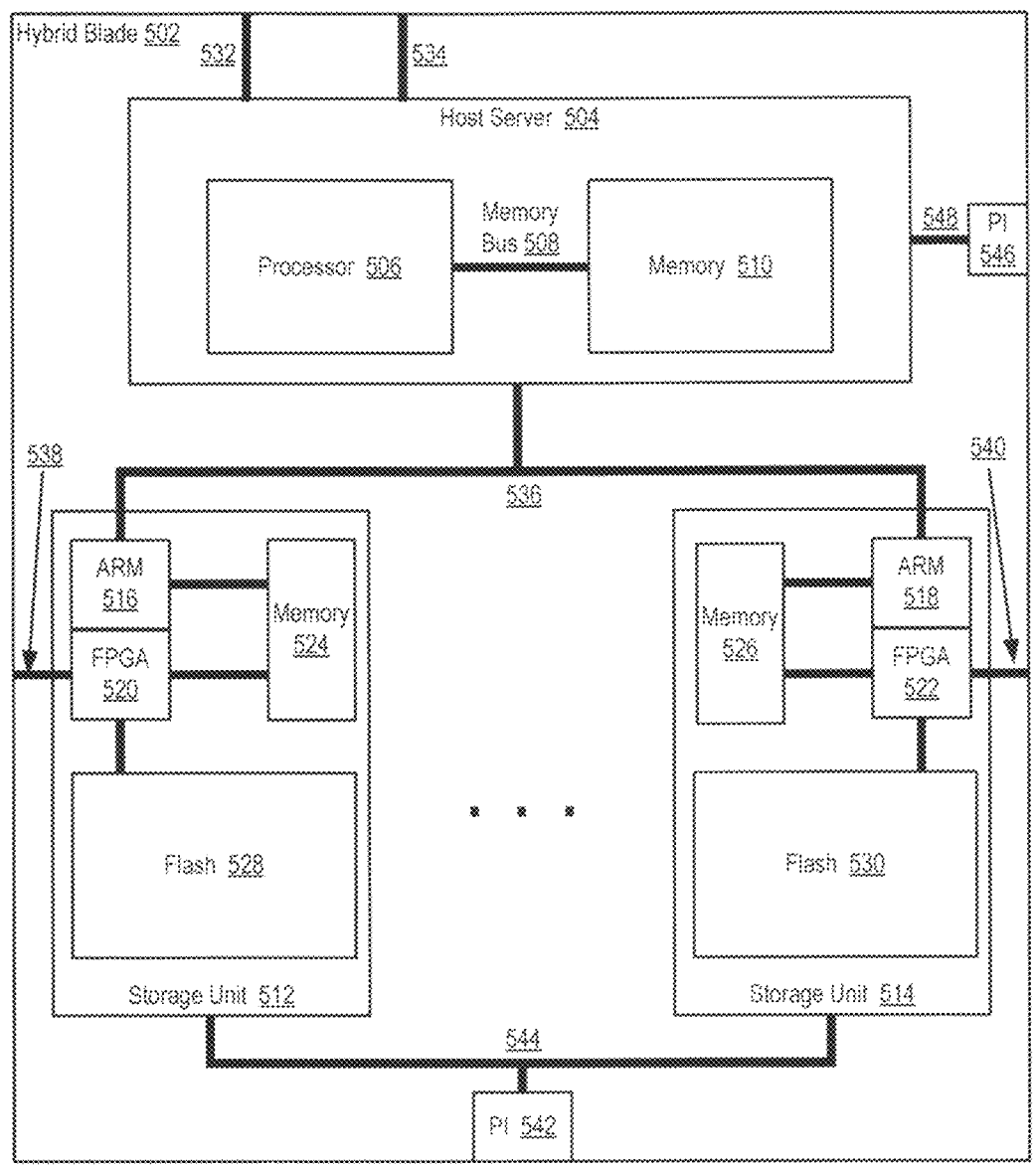
FIG. 5 sets forth a diagram of a hybrid blade useful in storage systems that support independent scaling of compute resources and storage resources according to embodiments of the present disclosure.

For further explanation, FIG. 5 sets forth a diagram of a hybrid blade (502) useful in storage systems that support independent scaling of compute resources and storage resources according to embodiments of the present disclosure. The hybrid blade (502) depicted in FIG. 5 is referred to as a 'hybrid' blade because the hybrid blade (502) includes both compute resources and storage resources.

The compute resources in the hybrid blade (502) depicted in FIG. 5 includes a host server (504) that contains a computer processor (506) coupled to memory (510) via a memory bus (508). The computer processor (506) depicted in FIG. 5 may be embodied, for example, as a central processing unit ('CPU') or other form of electronic circuitry configured to execute computer program instructions. The computer processor (506) may utilize the memory (510) to store data or other information useful during the execution of computer program instructions by the computer processor (506). Such memory (510) may be embodied, for example, as DRAM that is utilized by the computer processor (506) to store information when the computer processor (506) is performing computational tasks such as creating and sending I/O operations to one of the storage units (512, 514), breaking up data, reassembling data, and other tasks. In the example depicted in FIG. 2, the host server (504) can represent compute resources that the hybrid blade (502) may offer for use by entities executing on a storage system that includes the hybrid blade (502). For example, one or more authorities (which will be described in greater detail below) that are executing on the storage system may execute on the host server (504).

In the example depicted in FIG. 5, the host server (504) is coupled to two data communication links (532, 534). Such data communications links (532, 534) may be embodied, for example, as Ethernet links, such that the host server (504) can be coupled to a data communication network via a network adapter (not shown) contained in the host server (504). Through the use of such data communications links (532, 534), the host server (504) may receive input/output operations that are directed to the attached storage units (512, 514), such as requests to read data from the attached storage units (512, 514) or requests to write data to the attached storage units (512, 514), from other blades in a storage system that includes the hybrid blade (802).

The hybrid blade (502) depicted in FIG. 5 also includes storage resources in the form of one or more storage units (510, 514). Each storage unit (510, 514) may include flash (528, 530) memory as well as other forms of memory (524, 526), such as non-volatile random access memory ('NVRAM') which will be discussed in greater detail below. In the example depicted in FIG. 5, each storage unit (512, 514) can represent storage resources that the hybrid blade (502) may offer for use by users of a storage system that includes the hybrid blade (502). In the example depicted in FIG. 5, the storage units (512, 514) may include integrated circuits such as a field-programmable gate array ('FPGA') (520, 522), microprocessors such as an Advanced RISC Machine ('ARM') microprocessor that are utilized to write data to and read data from the flash (528, 530) memory as well as the other forms of memory (524, 526) in the storage unit (512, 514), or any other form of computer processor. The FPGAs (520, 522) and the ARM (516, 518) microprocessors may, in some embodiments, perform operations other than strict memory accesses. For example, in some embodiments the FPGAs (520, 522) and the ARM (516, 518) microprocessors may break up data, reassemble data, and so on. In the example depicted in FIG. 5, the computer processor (506) may access the storage units (512, 514) via a data communication bus (536) such as a Peripheral Component Interconnect Express ('PCIe') bus. In the example depicted in FIG. 5, the data communication bus (536), ARM (516, 518) microprocessors, and FPGAs (520, 522) form a local access interface through which the local compute resources (e.g., the host server (504)) can access the local storage resources (e.g., the flash memory (528, 530) and other forms of memory (524, 526)).

In the example depicted in FIG. 5, the hybrid blade (502) also includes data communications links (538, 540) that may be used to communicatively couple one or more of the storage units (512, 514) to other blades in the storage system. The data communications links (538, 540) may be embodied, for example, as an Ethernet link that enables an FPGA (520, 522) in the storage unit (512, 514) to couple to a data communications network. The data communications links (538, 540) and the FPGAs (520, 522) may collectively form a remote access interface through which compute resources on a remote blade can access the local storage resources (e.g., the flash memory (528, 530) and other forms of memory (524, 526)) without utilizing the local compute resources (e.g., the host server (504)). In such an example, compute resources on a remote blade may send an instruction to write data to, or read data from, the local storage resources directly to the FPGA (520, 522) in the storage unit (512, 514) via the data communications links (538, 540). In such a way, compute resources on a remote blade can directly access local storage resources on the hybrid blade (502) without needing to route such an access request through the local compute resources on the hybrid blade (502).

Although in some embodiments the remote access interface may be embodied as an Ethernet interface and the local access interface may be embodied as a PCIe interface, readers will appreciate that hybrid blades (502) according to embodiments of the present disclosure may utilize other types of interfaces for the remote access interface and the local access interface. In some embodiments the remote access interface and the local access interface may be implemented using the same technologies, in other embodiments the remote access interface and the local access interface may be implemented using other technologies, and so on.

In the example depicted in FIG. 5, the hybrid blade (502) also includes a power interface (546) and a power distribution bus (548) through which power can be provided to the host server (504). The power interface (546) may be coupled, for example, to a first power supply, to a first power bus that is external to the hybrid blade (502) and provided by the chassis that the blade is mounted within, and so on. Readers will appreciate that the power interface (546) and the power distribution bus (548) may collectively form a first local power domain that is configured to deliver power to the local compute resources (e.g., the host server (504)).

In the example depicted in FIG. 5, the hybrid blade (502) also includes a power interface (542) and a power distribution bus (544) through which power can be provided to one or more of the storage units (512, 514). The power interface (542) may be coupled, for example, to a second power supply, to a second power bus that is external to the hybrid blade (502) and provided by the chassis that the blade is mounted within, and so on. Readers will appreciate that the power interface (542) and the power distribution bus (544) may collectively form a second local power domain that is configured to deliver power to the local storage resources (e.g., the storage units (512, 514)). In the example depicted in FIG. 5, the first local power domain and the second local power domain can be independently operated as the power interfaces (542, 546) may be enabled or disabled independently, the distinct power supplies that are coupled to the power interfaces (542, 546) may be enabled or disabled independently, the distinct power busses that are coupled to the power interfaces (542, 546) may be enabled or disabled independently, and so on. In such a way, the delivery of power to the host server (504) may be enabled or disabled independently of the delivery of power to one or more of the storage units (512, 514), and vice versa.

Readers will appreciate that in the example depicted in FIG. 5, the second local power domain described in the preceding paragraph can also include a remote access interface such as the data communications links (538, 540). As described above, the data communications links (538, 540) may be embodied as an Ethernet link that enables an FPGA (520, 522) in the storage unit (512, 514) to couple to a data communications network. Power may therefore be delivered to the local storage resources (e.g., the storage units (512, 514)) via the data communications links (538, 540), for example, through the use of Power over Ethernet ('PoE') techniques. In such a way, when a remote blade is accessing the local storage resources via the remote access interface, the storage units (512, 514) may be powered using remote access interface, whereas the storage units (512, 514) may be powered using the power interfaces (542, 546) and the power distribution bus (544) when the local compute resources are accessing the local storage resources. In alternative embodiments, power may be provided to the storage units (512, 514) in different ways, so long as the delivery of power to the host server (504) may be enabled or disabled independently of the delivery of power to one or more of the storage units (512, 514), and vice versa.

The preceding paragraphs describe non-limiting, example embodiments of a first local power domain and a second local power domain. In alternative embodiments, the first local power domain and the second local power domain may include fewer or additional components. The first local power domain and the second local power domain may also be configured to deliver power to components within the hybrid blade (502) in coordination with components that are external to the hybrid blade (502) such as, for example, external power supplies, external power busses, external data communications networks, and so on. The first local power domain and the second local power domain may also be coupled to receive power from the same power source (e.g., the same power supply), so long as the delivery of power to the host server (504) may be enabled or disabled independently of the delivery of power to one or more of the storage units (512, 514), and vice versa. In an embodiment where the first local power domain and the second local power domain may receive power from the same power source, the delivery of power to the host server (504) may be enabled or disabled independently of the delivery of power to one or more of the storage units (512, 514), and vice versa, through the use of a switching mechanism, power delivery network, or other mechanism that enables the delivery of power to each power domain to be blocked or enabled independently. Readers will appreciate that additional embodiments are possible that are consistent with the spirit of the present disclosure.

Readers will appreciate that other types of blades may also exist. For example, a compute blade may be similar to the hybrid blade (502) depicted in FIG. 5 as the compute blade may include one or more host servers that are similar to the host server (504) depicted in FIG. 5. Such a compute blade may be different than the hybrid blade (502) depicted in FIG. 5, however, as the compute blade may lack the storage units (512, 514) depicted in FIG. 5. Readers will further appreciate that a storage blade may be similar to the hybrid blade (502) depicted in FIG. 5 as the storage blade may include one or more storage units that are similar to the storage units (512, 514) depicted in FIG. 5. Such a storage blade may be different than the hybrid blade (502) depicted in FIG. 5, however, as the storage blade may lack the host server (504) depicted in FIG. 5. The example blade (502) depicted in FIG. 5 is included only for explanatory purposes. In other embodiments, the blades may include additional processors, additional storage units, compute resources that are packaged in a different manner, storage resources that are packaged in a different manner, and so on.

Figure 6:
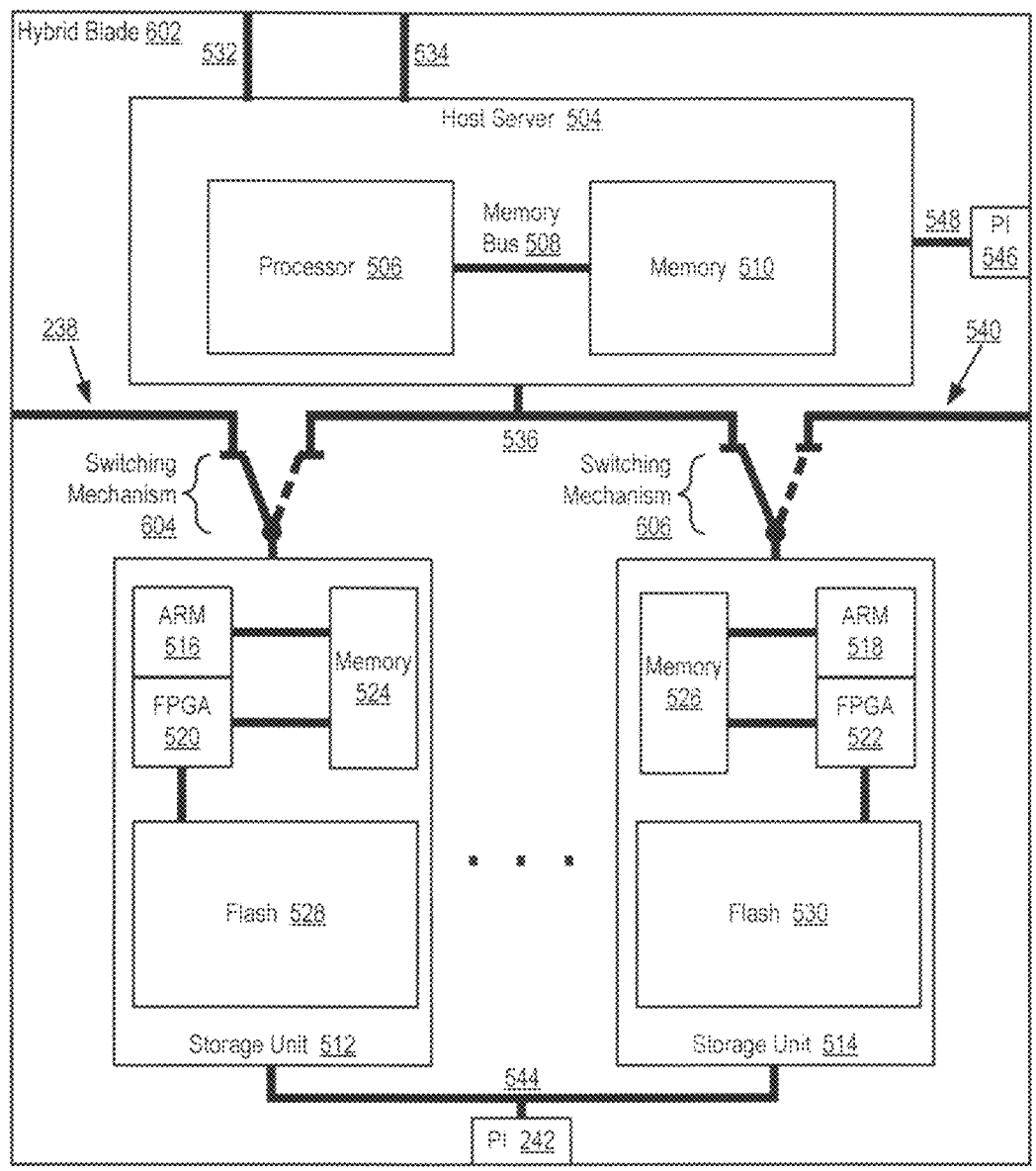
FIG. 6 sets forth a diagram of an additional hybrid blade useful in storage systems that support independent scaling of compute resources and storage resources according to embodiments of the present disclosure.

For further explanation, FIG. 6 sets forth a diagram of an additional hybrid blade (602) useful in storage systems that support independent scaling of compute resources and storage resources according to embodiments of the present disclosure. The hybrid blade (602) depicted in FIG. 6 is similar to the hybrid blade (502) depicted in FIG. 5, as the hybrid blade (802) depicted in FIG. 6 also includes local storage resources such as the storage units (512, 514), local compute resources such as the host server (504), a local access interface through which the local compute resources can access the local storage resources, a remote access interface through which compute resources on a remote blade can access the local storage resources without utilizing the local compute resources, a first local power domain configured to deliver power to the local compute resources, and a second local power domain configured to deliver power to the local storage resources, where the first local power domain and the second local power domain can be independently operated.

The hybrid blade (602) depicted in FIG. 6 also includes a switching mechanism (604, 606) that is configured to provide access to local storage resources such as the storage units (512, 514). Each switching mechanism (604, 606) may be configured to couple to the local compute resources via a first interface and further configured to couple to remote compute resources via a second interface. The first switching mechanism (604), for example, may be coupled to local compute resources in the form of a host server (504) via a first interface such as the local access interface and also coupled to remote compute resources in the form of a host server on a remote blade (not shown) via a second interface such as the remote access interface that includes the data communications link (538). The second switching mechanism (606) may be coupled to local compute resources in the form of a host server (504) via a first interface such as the local access interface and also coupled to remote compute resources in the form of a host server on a remote blade (not shown) via a second interface such as the remote access interface that includes the data communications link (540). In the specific example illustrated in FIG. 6, the first switching mechanism (604) is coupled to the remote access interface that includes the data communications link (538), such that the storage unit (512) may be accessed by a host server on a remote blade without utilizing the local compute resources in the hybrid blade (602). The second switching mechanism (606), however, is coupled to the local access interface, such that the storage unit (514) may be accessed by the local compute resources in the hybrid blade (602). In such an example, however, the dashed lines in the switching mechanisms (604, 606) are used to illustrate that each switching mechanism (604, 606) may be reconfigured to couple the storage units (512, 514) to a different data communications pathway. In the example depicted in FIG. 6, each switching mechanism (604, 606) may be embodied as a mechanical device that can facilitate a data communications connection between a particular storage unit (512, 514) and a plurality of data communications pathways, although at any particular time each switching mechanism (604, 606) may only facilitate data communications between the particular storage unit (512, 514) and a single data communications pathway.

Figure 7:
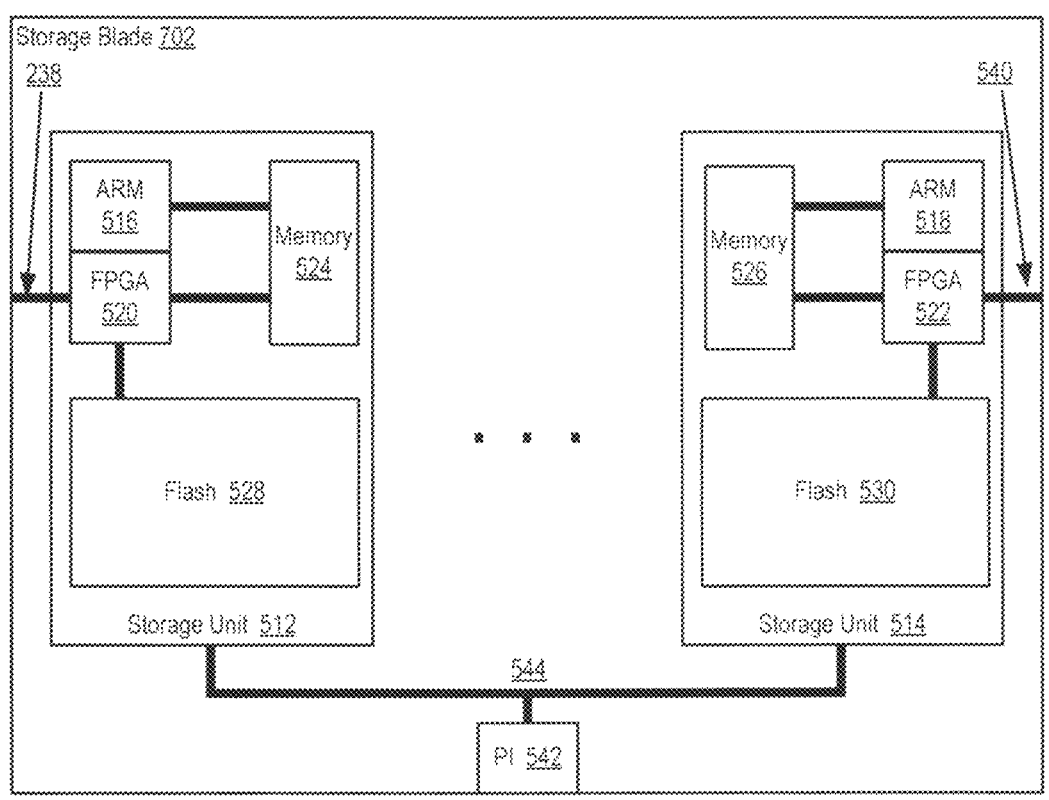
FIG. 7 sets forth a diagram of a storage blade useful in storage systems that support independent scaling of compute resources and storage resources according to embodiments of the present disclosure.

For further explanation, FIG. 7 sets forth a diagram of a storage blade (702) useful in storage systems that support independent scaling of compute resources and storage resources according to embodiments of the present disclosure. The storage blade (702) depicted in FIG. 7 is similar to the hybrid blade described above with reference to FIG. 5 and FIG. 6, although the storage blade (702) is different than the hybrid blades described above as the storage blade (702) does not include any local compute resources that are available for use by a storage system that the storage blade (702) is included within.

The storage blade (702) depicted in FIG. 7 includes storage resources in the form of one or more storage units (512, 514). Each storage unit (512, 514) may include flash (528, 530) memory as well as other forms of memory (524, 526), such as 'NVRAM, which will be discussed in greater detail below. In the example depicted in FIG. 4, each storage unit (512, 514) can represent storage resources that the storage blade (702) may offer for use by users of a storage system that includes the storage blade (702).

In the example depicted in FIG. 7, the storage units (512, 514) may include integrated circuits such as an FPGA (520, 522), microprocessors such as an ARM microprocessor that are utilized to write data to and read data from the flash (528, 530) memory as well as the other forms of memory (524, 526) in the storage unit (512, 514), or any other form of computer processor. The FPGAs (520, 522) and the ARM (516, 518) microprocessors may, in some embodiments, perform operations other than strict memory accesses. For example, in some embodiments the FPGAs (520, 522) and the ARM (516, 518) microprocessors may break up data, reassemble data, and so on.

In the example depicted in FIG. 7, the storage blade (702) also includes data communications links (538, 540) that may be used to couple one or more of the storage units (512, 514) to other blades in the storage system. The data communications links (538, 540) may be embodied, for example, as an Ethernet link that enables an FPGA (520, 522) in the storage unit (512, 514) to couple to a data communications network. The data communications links (538, 540) and the FPGAs (520, 522) may collectively form a remote access interface through which compute resources on a remote blade can access the local storage resources (e.g., the flash memory (528, 530) and other forms of memory (524, 526)) without utilizing any local compute resources on the storage blade (702). In such an example, compute resources on a remote blade may send an instruction to write data to, or read data from, the local storage resources directly to the FPGA (520, 522) in the storage unit (512, 514) via the data communications links (538, 540). In such a way, compute resources on a remote blade can directly access local storage resources on the hybrid blade (502) without needing to route such an access request through local compute resources on the storage blade (702).

In the example depicted in FIG. 7, the storage blade (702) also includes a power interface (542) and a power distribution bus (544) through which power can be provided to one or more of the storage units (512, 514). The power interface (542) may be coupled, for example, to a power supply, to a power bus that is external to the hybrid blade (502) and provided by the chassis that the blade is mounted within, and so on. Readers will appreciate that the power interface (542) and the power distribution bus (544) may collectively form a local power domain configured to deliver power to the local storage resources (e.g., the storage units (512, 514). Readers will appreciate that in the example depicted in FIG. 7, the local power domain can also include a remote access interface such as the data communications links (538, 540). As described above, the data communications links (538, 540) may be embodied as an Ethernet link that enables an FPGA (520, 522) in the storage unit (512, 514) to couple to a data communications network. Power may therefore be delivered to the local storage resources (e.g., the storage units (512, 514)) via the data communications links (538, 540), for example, through the use of PoE techniques. In such a way, power may be delivered to the storage units (512, 514) via the remote access interface, via the power interface (542) and power distribution bus (544), or any combination thereof.

Figure 8:
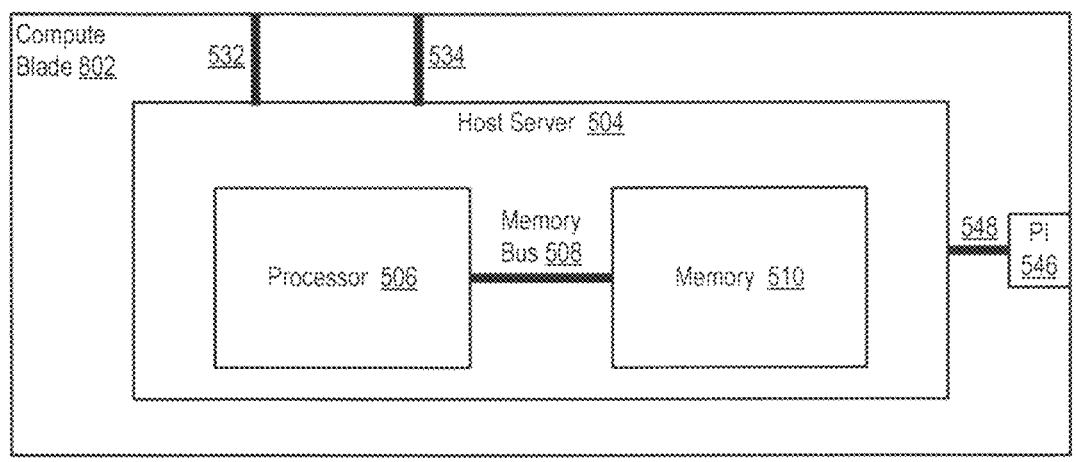
FIG. 8 sets forth a diagram of a compute blade useful in storage systems that support independent scaling of compute resources and storage resources according to embodiments of the present disclosure.

For further explanation, FIG. 8 sets forth a diagram of a compute blade (802) useful in storage systems that support independent scaling of compute resources and storage resources according to embodiments of the present disclosure. The compute blade (802) depicted in FIG. 8 is similar to the hybrid blade described above with reference to FIG. 5 and FIG. 6, although the compute blade (802) is different than the hybrid blades described above as the compute blade (802) does not include any local storage resources that may be used that are available for use by a storage system that the compute blade (802) is included within.

The compute resources in the compute blade (802) depicted in FIG. 8 includes a host server (504) that contains a computer processor (506) coupled to memory (510) via a memory bus (508). The computer processor (506) depicted in FIG. 8 may be embodied, for example, as a CPU or other form of electronic circuitry configured to execute computer program instructions. The computer processor (506) may utilize the memory (510) to store data or other information useful during the execution of computer program instructions by the computer processor (506). Such memory (510) may be embodied, for example, as DRAM that is utilized by the computer processor (506) to store information when the computer processor (506) is performing computational tasks such as creating and sending I/O operations to one of the storage units (512, 514), breaking up data, reassembling data, and other tasks. In the example depicted in FIG. 5, the host server (504) can represent compute resources that the compute blade (802) may offer for use by entities executing on a storage system that includes the compute blade (802). For example, one or more authorities (which will be described in greater detail below) that are executing on the storage system may execute on the host server (504). In the example depicted in FIG. 8, the host server (504) is coupled to two data communication links (532, 534). Such data communications links (532, 534) may be embodied, for example, as Ethernet links, such that the host server (504) can be coupled to a data communication network via a network adapter (not shown) contained in the host server (504).

In the example depicted in FIG. 8, the compute blade (802) also includes a power interface (546) and a power distribution bus (548) through which power can be provided to the host server (504). The power interface (546) may be coupled, for example, to a power supply, to a power bus that is external to the compute blade (802) and provided by the chassis that the blade is mounted within, and so on. Readers will appreciate that the power interface (546) and the power distribution bus (548) may collectively form a local power domain that is configured to deliver power to the local compute resources (e.g., the host server (504)) in the compute blade (802).

Figure 9:
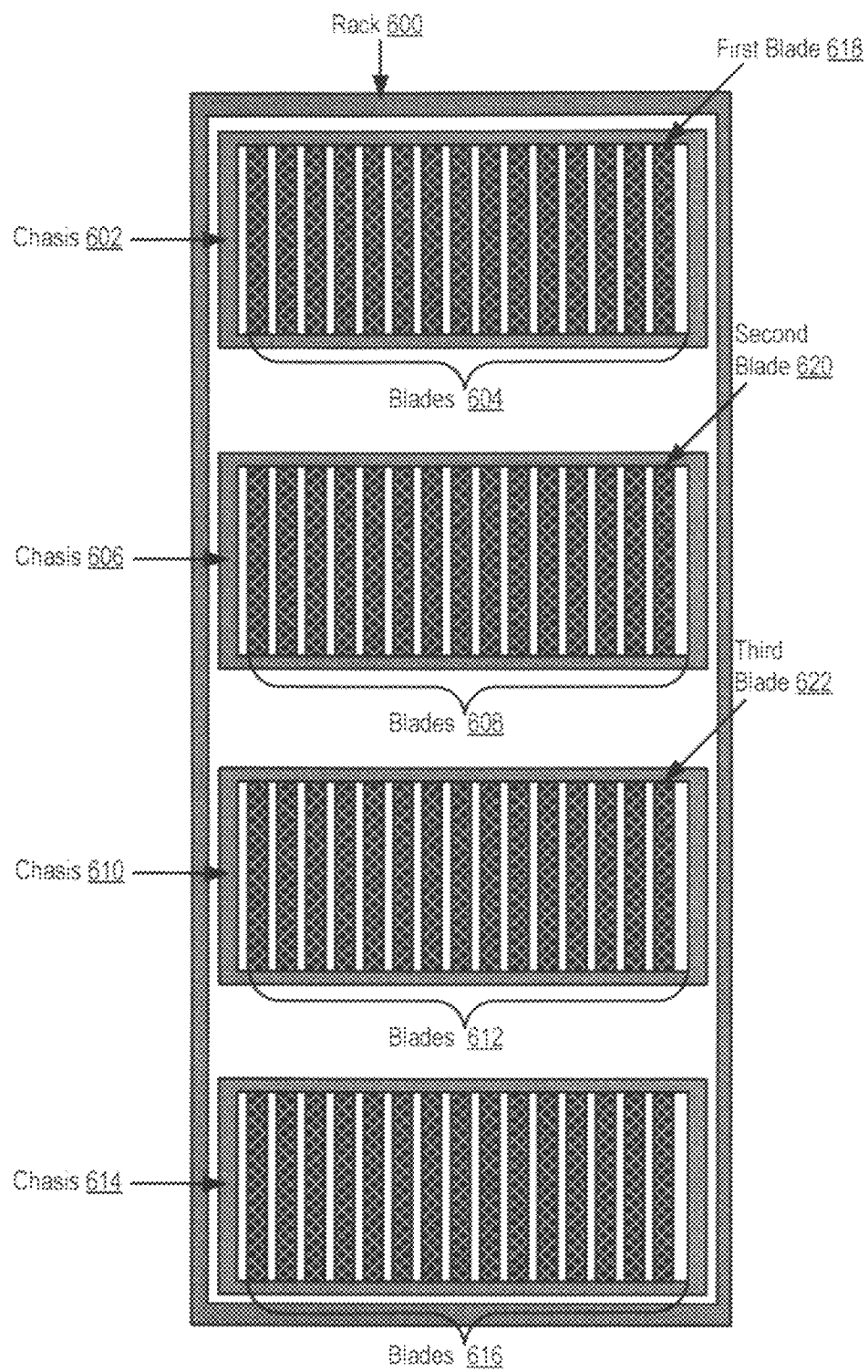
FIG. 9 sets forth a diagram of a storage system that supports independent scaling of compute resources and storage resources according to embodiments of the present disclosure.

For further explanation, FIG. 9 sets forth a diagram of a storage system that supports independent scaling of compute resources and storage resources according to embodiments of the present disclosure. The storage system of FIG. 9 includes a plurality of chassis (602, 606, 610, 614) mounted within a rack (600). The rack (600) depicted in FIG. 9 may be embodied as a standardized frame or enclosure for mounting multiple equipment modules, such as multiple chassis (602, 606, 610, 614). The rack (600) may be embodied, for example, as a 19-inch rack that includes edges or ears that protrude on each side, thereby enabling a chassis (602, 606, 610, 614) or other module to be fastened to the rack (600) with screws or some other form of fastener. Readers will appreciate that while the storage system depicted in FIG. 6 includes a plurality of chassis (602, 606, 610, 614) mounted within a single rack (600), in other embodiments the plurality of chassis (602, 606, 610, 614) may be distributed across multiple racks. For example, a first chassis in the storage system may be mounted within a first rack, a second chassis in the storage system may be mounted within a second rack, and so on.

Although depicted in less detail, each of the chassis (602, 606, 610, 614) depicted in FIG. 9 may be similar to the chassis described above with reference to FIG. 1, as the chassis (602, 606, 610, 614) include a plurality of slots, where each slot is configured to receive a blade. The chassis (602, 606, 610, 614) depicted in FIG. 9 may be embodied, for example, as passive elements that includes no logic. Each chassis (602, 606, 610, 614) may include a mechanism, such as a power distribution bus, that is utilized to provide power to each blade that is mounted within the chassis (602, 606, 610, 614). Each chassis (602, 606, 610, 614) may further include a communication mechanism, such as a communication bus, that enables communication between each blade that is mounted within the chassis (602, 606, 610, 614). The communication mechanism may be embodied, for example, as an Ethernet bus, a PCIe bus, InfiniBand bus, and so on. In some embodiments, each chassis (602, 606, 610, 614) may include at least two instances of both the power distribution mechanism and the communication mechanism, where each instance of the power distribution mechanism and each instance of the communication mechanism may be enabled or disabled independently.

Each chassis (602, 606, 610, 614) depicted in FIG. 9 may also include one or more ports for receiving an external communication bus that enables communication between multiple chassis (602, 606, 610, 614), directly or through a switch, as well as communications between a chassis (602, 606, 610, 614) and an external client system. The external communication bus may use a technology such as Ethernet, InfiniBand, Fibre Channel, and so on. In some embodiments, the external communication bus may use different communication bus technologies for inter-chassis communication than is used for communication with an external client system. In embodiments where one or more switches are deployed, each switch may act as a translation layer between multiple protocols or technologies. When multiple chassis (602, 606, 610, 614) are connected to define a storage cluster, the storage cluster may be accessed by a client using either proprietary interfaces or standard interfaces such a PCIe interface, a SAS interfaces, a SATA interface, or other interface using protocols such as network file system ('NFS'), common internet file system ('CIFS'), small computer system interface ('SCSI'), hypertext transfer protocol ('HTTP'), Object storage protocols, and so on. Translation from the client protocol may occur at the switch, external communication bus, or within each blade.

Each chassis (602, 606, 610, 614) depicted in FIG. 9 houses fifteen blades (604, 608, 612, 616), although in other embodiments each chassis (602, 606, 610, 614) may house more or fewer blades. Each of the blades (604, 608, 612, 616) depicted in FIG. 9 may be embodied, for example, as a computing device that includes one or more computer processors, DRAM, flash memory, interfaces for one more communication busses, interfaces for one or more power distribution busses, cooling components, and so on. Readers will appreciate that the blades (604, 608, 612, 616) depicted in FIG. 9 may be embodied as different types of blades, such that the collective set of blades (604, 608, 612, 616) include heterogeneous members. Blades may be of different types as some blades (604, 608, 612, 616) may only provide processing resources to the overall storage system, some blades (604, 608, 612, 616) may only provide storage resources to the overall storage system, and some blades (604, 608, 612, 616) may provide both processing resources and storage resources to the overall storage system. Furthermore, even the blades (604, 608, 612, 616) that are identical in type may be different in terms of the amount of storage resources that the blades (604, 608, 612, 616) provide to the overall storage system. For example, a first blade that only provides storage resources to the overall storage system may provide 8 TB of storage while a second blade that only provides storage resources to the overall storage system may provide 256 TB of storage. The blades (604, 608, 612, 616) that are identical in type may also be different in terms of the amount of processing resources that the blades (604, 608, 612, 616) provide to the overall storage system. For example, a first blade that only provides processing resources to the overall storage system may include more processors or more powerful processors than a second blade that only provides processing resources to the overall storage system. Readers will appreciate that other differences may also exist between two individual blades and that blade uniformity is not required according to embodiments described herein.

Although not explicitly depicted in FIG. 9, each chassis (602, 606, 610, 614) may include one or more modules, data communications busses, or other apparatus that is used to identify which type of blade is inserted into a particular slot of the chassis (602, 606, 610, 614). In such an example, a management module may be configured to request information from each blade in each chassis (602, 606, 610, 614) when each blade is powered on, when the blade is inserted into a chassis (602, 606, 610, 614), or at some other time. The information received by the management module can include, for example, a special purpose identifier maintained by the blade that identifies the type (e.g., storage blade, compute blade, hybrid blade) of blade that has been inserted into the chassis (602, 606, 610, 614). In an alternative embodiment, each blade (604, 608, 612, 616) may be configured to automatically provide such information to a management module as part of a registration process.

In the example depicted in FIG. 9, the storage system may be initially configured by a management module that is executing remotely. The management module may be executing, for example, in a network switch control processor. Readers will appreciate that such a management module may be executing on any remote CPU and may be coupled to the storage system via one or more data communication networks. Alternatively, the management module may be executing locally as the management module may be executing on one or more of the blades (604, 608, 612, 616) in the storage system.

The storage system depicted in FIG. 9 includes a first blade (618) mounted within one of the chassis (602) that includes one or more storage resources but does not include compute resources. The first blade (618) may be embodied, for example, as a storage blade such as the storage blade described above with reference to FIG. 7. The storage system depicted in FIG. 9 also includes a second blade (620) mounted within one of the chassis (606) that includes one or more compute resources but does not include storage resources. The second blade (620) may be embodied, for example, as a compute blade such as the compute blade described above with reference to FIG. 8. The storage system depicted in FIG. 9 also includes a third blade (622) mounted within one of the chassis (610) that includes one or more storage resources and one or more compute resources. The third blade (622) may be embodied, for example, as a hybrid blade such as the hybrid blades described above with reference to FIG. 5 and FIG. 6.

The third blade (622) depicted in FIG. 9 may include a local access interface through which the compute resources in the third blade (622) can access the storage resources in the third blade (622). The compute resources in the third blade (622) may be embodied, for example, as one or more host servers that include a computer processor coupled to memory via a memory bus. The storage resources in the third blade (622) may be embodied, for example, as one or more storage units that include flash memory as well as other forms of memory, such as NVRAM, which will be discussed in greater detail below. In such an example, the compute resources in the third blade (622) may access the storage resources (622) in the third blade (622), for example, via a local access interface such as a data communication bus that forms a data communications path between the compute resources in the third blade (622) and the storage resources (622) in the third blade (622), as well as any other microprocessors, FPGAs, or other computing devices required to carry out data communications between the compute resources in the third blade (622) and the storage resources (622) in the third blade (622).

The third blade (622) depicted in FIG. 9 may also include a remote access interface through which compute resources in a remote blade can access the storage resources in the third blade (622) without utilizing the compute resources in the third blade (622). The remote access interface may be embodied, for example, as a data communications interface in the third blade (622) that enables an FPGA, microprocessor, or other form of computing device that is part of the storage resources in the third blade (622) to couple to a data communications network. In such an example, compute resources on a remote blade may send an instruction to write data to, or read data from, the storage resources on the third blade (622) directly to microprocessor, or other form of computing device that is part of the storage resources in the third blade (622). In such a way, compute resources on a remote blade can directly access storage resources on the third blade (622) without needing to route such an access request through the compute resources on the third blade (622). Readers will appreciate that the remote access interface in the third blade (622) may utilize first data communications protocol while the local access interface in the third blade (622) may utilize a different, second data communications protocol.

The third blade (622) depicted in FIG. 9 may also include a first power interface for delivering power to the compute resources in the third blade (622). The first power interface may be embodied, for example, as a port for coupling to a power source that is external to the third blade (622) and a power distribution bus that couples the port to one or more compute resources such as a host server. The port may be coupled, for example, to a first power supply, to a first power bus that is external to the third blade (622) and provided by the chassis (610) that the blade is mounted within, and so on.

The third blade (622) depicted in FIG. 9 may also include a second power interface for delivering power to the storage resources in the third blade (622). The second power interface may be embodied, for example, as a port for coupling to a power source that is external to the third blade (622) and a power distribution bus that couples the port to one or more storage resources such as one or more storage units. The port may be coupled, for example, to a second power supply, to a second power bus that is external to the third blade (622) and provided by the chassis (610) that the blade is mounted within, and so on.

In the example depicted in FIG. 9, power delivery to the first power interface in the third blade (622) may be controlled independently of power delivery to the second power interface in the third blade (622). Power delivery to the first power interface may be controlled independently of power delivery to the second power interface, for example, because the first power interface is coupled to a first power source and the second power interface is coupled to a second power source. In such an example, powering up or down either power source would result in power delivery to the first power interface being controlled independently of power delivery to the second power interface.

Power delivery to the first power interface may also be controlled independently of power delivery to the second power interface, for example, because the first power interface can be enabled or disabled independently of enabling or disabling the second power interface, the second power interface can be enabled or disabled independently of enabling or disabling the first power interface, and so on. In such an example, each of the power interfaces may include some mechanism that allows the power interface to block the flow of electricity through the power interface, such that the power interface is disabled. Each power interfaces may likewise include some mechanism, which may be the same mechanism as described in the preceding sentence, that allows the power interface to permit the flow of electricity through the power interface, such that the power interface is enabled.

In the example depicted in FIG. 9, the second power interface in the third blade (622) may be included within the remote access interface in the third blade (622). As described above, the remote access interface in the third blade (622) may be embodied as an Ethernet link that enables an FPGA, microprocessor, or other computing device in a storage unit in the third blade (622) to couple to a data communications network. Power may therefore be delivered to the storage unit in the third blade (622) such an Ethernet link, for example, through the use of PoE techniques. In such a way, when a remote blade is accessing the storage unit in the third blade (622) via the remote access interface in the third blade (622), such a storage unit may be powered using remote access interface.

The third blade (622) depicted in FIG. 9 may also include a switching mechanism configured to provide access to the storage resources in the third blade (622), where the switching mechanism is configured to couple to compute resources in the third blade (622) via a first interface and also configured to couple to compute resources on a remote blade via a second interface. The switching mechanism may be coupled to local storage resources via a first interface such as a data communications link that is coupled to compute resources within the third blade (622). The switching mechanism may also be coupled to local storage resources via a second data communications link that is coupled to compute resources on another blade in the storage system, such that the local storage resources may be accessed without utilizing compute resources within the third blade (622). The switching mechanism may be embodied as a mechanical device that can facilitate a data communications connection between a particular storage unit and a plurality of data communications pathways, although at any particular time the switching mechanism may only facilitate data communications between the particular storage unit and a single data communications pathway.

Figure 10:
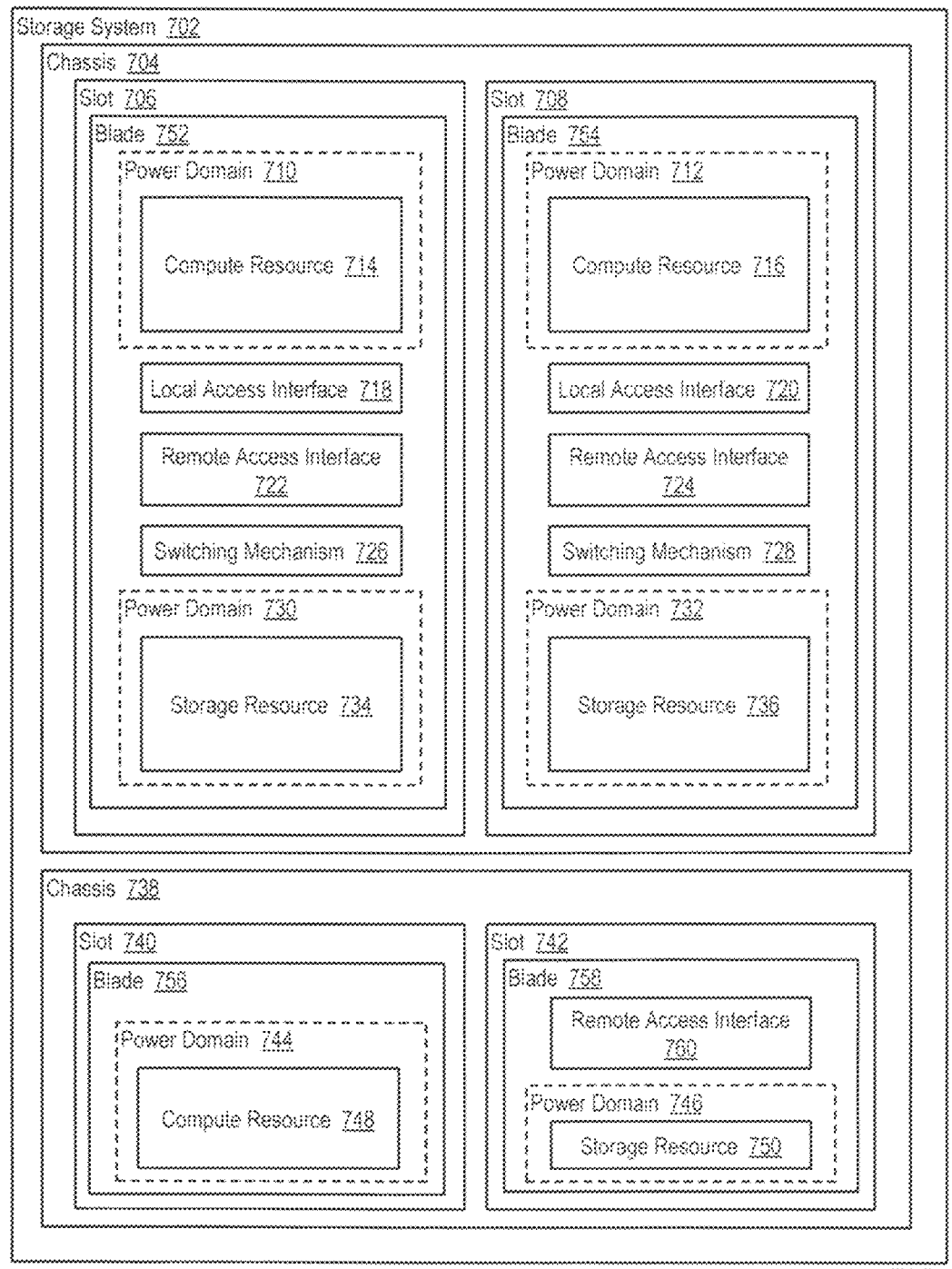
FIG. 10 sets forth a diagram of a storage system that supports independent scaling of compute resources and storage resources according to embodiments of the present disclosure.

For further explanation, FIG. 10 sets forth a diagram of a storage system (702) that supports independent scaling of compute resources and storage resources according to embodiments of the present disclosure. The storage system (702) depicted in FIG. 10 includes one or more chassis (704, 738). Although depicted in less detail, each of the chassis (704, 738) depicted in FIG. 10 may be similar to the chassis described above with reference to FIG. 4, as each chassis (704, 738) includes a plurality of slots, where each slot is configured to receive a blade. Each chassis (704, 738) may include mechanisms, such as one or more power distribution busses, that are utilized to provide power to blades that are mounted within the chassis (704, 738). Each chassis (704, 738) may further include mechanisms, such as one or more communication busses, that facilitate data communications between one or more blades that are mounted within the chassis (704, 738), as well as other data communications devices such as network switches that are mounted within the chassis (704, 738). The communication mechanisms may be embodied, for example, as one or more Ethernet busses, as one or more PCIe busses, as one or more InfiniBand busses, and so on. In some embodiments, each chassis (704, 738) may include at least two instances of both a power distribution mechanism and a communication mechanism, where each instance of the power distribution mechanism and each instance of the communication mechanism may be enabled or disabled independently.

Each chassis (704, 738) depicted in FIG. 10 may also include one or more ports for receiving an external communication bus that enables communication between multiple chassis (704, 738), directly or through a switch, as well as communications between a chassis (704, 738) and an external client system. The external communication bus may use a technology such as Ethernet, InfiniBand, Fibre Channel, and so on. In some embodiments, the external communication bus may use different communication bus technologies for inter-chassis communication than is used for communication with an external client system. In embodiments where one or more switches are deployed, each switch may act as a translation layer between multiple protocols or technologies. When multiple chassis (704, 738) are connected to define a storage cluster, the storage cluster may be accessed by a client using either proprietary interfaces or standard interfaces such as a PCIe interface, a SAS interfaces, a SATA interface, or other interface using protocols such as NFS, CIFS, SCSI, HTTP, Object, and so on. Translation from the client protocol may occur at the switch, external communication bus, or within each blade.

Although not explicitly depicted in FIG. 10, each chassis (704, 738) may include one or more modules, data communications busses, or other apparatus that is used to identify which type of blade is inserted into a particular slot of the chassis (704, 738). In such an example, a management module may be configured to request information from each blade in each chassis (704, 738) when each blade is powered on, when the blade is inserted into a chassis (704, 738), or at some other time. The information received by the management module can include, for example, a special purpose identifier maintained by the blade that identifies the type (e.g., storage blade, compute blade, hybrid blade) of blade that has been inserted into the chassis (704, 738). In an alternative embodiment, each blade may be configured to automatically provide such information to a management module as part of a registration process.

The storage system (702) depicted in FIG. 10 also includes a plurality of compute resources (714, 716, 748). The compute resources (714, 716, 748) in the storage system (702) depicted in FIG. 10 may be embodied, for example, as one or more host servers such as the host servers described above with reference to FIGS. 5, 6, and 8. Such host servers may reside in blades (752, 754, 756) that are mounted within one or more slots (706, 708, 740) in the storage system (702).

The storage system (702) depicted in FIG. 10 also includes a plurality of storage resources (734, 736, 750). The storage resources (734, 736, 750) in the storage system (702) depicted in FIG. 10 may be embodied, for example, as one or more storage units such as the storage units described above with reference to FIGS. 5, 6, and 7. Such storage units may reside in blades (752, 754, 758) that are mounted within one or more slots (706, 708, 742) in the storage system (702).

The storage system (702) depicted in FIG. 10 also includes a plurality of blades (752, 754, 756, 758). In the example depicted in FIG. 10, each of the blades (752, 754, 756, 758) includes at least one compute resource (714, 716, 748) or at least one storage resource (734, 736, 750). Each of the blades (752, 754, 756, 758) may therefore be embodied, for example, as a hybrid blade, as a compute blade, or as a storage blade as described above with reference to FIGS. 5, 6, 7, and 8.

In the example storage system (702) depicted in FIG. 10, each of the storage resources (734, 736, 750) may be directly accessed by each of the compute resources (714, 716, 748) without utilizing an intermediate compute resource (714, 716, 748). Each of the storage resources (734, 736, 750) may be directly accessed by each of the compute resources (714, 716, 748) without utilizing an intermediate compute resource (714, 716, 748), for example, through the use of a remote access interface that provides access to the storage resources (734, 736, 750). Such a remote access interface may be embodied, for example, as an Ethernet link is coupled to an FPGA in a storage unit, thereby enabling the storage unit to be coupled for data communications with a data communications network that each of the remote compute resources (714, 716, 748) may also be coupled to. In such an example, compute resources on a remote blade can access a storage unit on a local blade without utilizing the compute resources on the local blade as the compute resources on the remote blade may send an instruction to write data to, or read data from, the storage unit, without routing such an instruction through compute resources on the local blade.

In the example depicted in FIG. 10, the storage system (702) also includes a first power domain configured to deliver power to one or more of the compute resources. The first power domain may be embodied, for example, as a power supply, power distribution bus, and power interface to a host server, where the first power interface is configured to deliver power to one or more of the compute resources. In the example depicted in FIG. 10, three power domains (710, 712, 744) are depicted that may serve as distinct instances of a first power domain that is configured to deliver power to one or more of the compute resources (714, 716, 748). Readers will appreciate that although each of the compute resources (714, 716, 748) depicted in FIG. 10 receive power from a distinct instance of a first power domain, in other embodiments, one or more of the compute resources (714, 716, 748) may be configured to receive power from the same instance of a first power domain, such that multiple compute resources (714, 716, 748) may be powered up or powered down by enabling or disabling the delivery of power by a single instance of a first power domain.

In the example depicted in FIG. 10, the storage system (702) also includes a second power domain configured to deliver power to the storage resources. The second power domain may be embodied, for example, as a power supply, power distribution bus, and power interface to a storage unit, where the second power domain is configured to deliver power to one or more of the storage resources. In the example depicted in FIG. 10, three power domains (730, 732, 746) are depicted that may serve as distinct instances of a second power domain that is configured to deliver power to one or more of the storage resources (734, 736, 750). Readers will appreciate that although each of the storage resources (734, 736, 750) depicted in FIG. 10 receive power from a distinct instance of a second power domain, in other embodiments, one or more of the storage resources (734, 736, 750) may be configured to receive power from the same instance of a second power domain, such that multiple storage resources (734, 736, 750) may be powered up or powered down by enabling or disabling the delivery of power by a single instance of a second power domain.

The preceding paragraphs describe non-limiting, example embodiments of a first power domain and a second power domain. In some embodiments, the first power domain and the second power domain may include fewer or additional components. The first power domain and the second power domain may also be configured to deliver power to components within the storage system (702) in coordination with components such as, for example, external power supplies, external power busses, external data communications networks, and so on. The first power domain and the second power domain may also be coupled to receive power from the same power source (e.g., the same power supply), so long as the delivery of power to one or more compute resources (714, 716, 748) may be enabled or disabled independently of the delivery of power to one or more storage resources (734, 736, 750), and vice versa. In an embodiment where the first power domain and the second power domain receive power from the same power source, the delivery of power to one or more compute resources (714, 716, 748) may be enabled or disabled independently of the delivery of power to one or more storage resources (734, 736, 750), and vice versa, through the use of a switching mechanism, power delivery network, or other mechanism that enables the delivery of power to each power domain to be blocked or enabled independently. Readers will appreciate that additional embodiments are possible that are consistent with the spirit of the present disclosure.

In the example depicted in FIG. 10, each instance of a first power domain can be operated independently of each instance of a second power domain. Each instance of a first power domain can be operated independently of each instance of a second power domain as the power interfaces within each power domain (710, 712, 730, 732, 744, 746) may be enabled or disabled independently, the distinct power supplies that provide power to each power domain (710, 712, 730, 732, 744, 746) may be enabled or disabled independently, the distinct power busses that are included in each power domain (710, 712, 730, 732, 744, 746) may be enabled or disabled independently, and so on. In such a way, the delivery of power to one or more compute resources (714, 716, 748) may be enabled or disabled independently of the delivery of power to one or more storage resources (734, 736, 750), and vice versa. Because the delivery of power to one or more compute resources (714, 716, 748) may be enabled or disabled independently of the delivery of power to one or more storage resources (734, 736, 750), independent scaling of each type of resources may be achieved by enabling or disabling the delivery of power to only one type (i.e., storage or compute) of resource. For example, enabling the delivery of power to one or more storage resources increases the amount of storage resources available in the storage system (702) without impacting the amount of compute resources available in the storage system (702), disabling the delivery of power to one or more storage resources decreases the amount of storage resources available in the storage system (702) without impacting the amount of compute resources available in the storage system (702), enabling the delivery of power to one or more compute resources increases the amount of compute resources available in the storage system (702) without impacting the amount of storage resources available in the storage system (702), disabling the delivery of power to one or more compute resources decreases the amount of compute resources available in the storage system (702) without impacting the amount of storage resources available in the storage system (702), and so on.

The storage system (702) depicted in FIG. 10 includes a blade (756) that includes compute resources (748) but does not include storage resources. Although the blade (756) that includes compute resources (748) but does not include storage resources is depicted in less detail, readers will appreciate that the blade (756) may be similar to the compute blade described above with reference to FIG. 8. The storage system (702) depicted in FIG. 10 also includes a blade (758) that includes storage resources (750) but does not include any compute resources. Although the blade (758) that includes storage resources (750) but does not include any compute resources is depicted in less detail, readers will appreciate that the blade (758) may be similar to the storage blade described above with reference to FIG. 7. The storage system (702) depicted in FIG. 10 also includes blades (752, 754) that include storage resources (734, 736) and compute resources (714, 716). Although the blades (752, 754) that include storage resources (734, 736) and compute resources (714, 716) are depicted in less detail, readers will appreciate that the blades (752, 754) may be similar to the hybrid blades described above with reference to FIG. 5 and FIG. 6.

In the example depicted in FIG. 10, each of the blades (752, 754) that include storage resources (734, 736) and compute resources (714, 716) can also include a local access interface (718, 720) through which the local compute resources (714, 716) can access the local storage resources (734, 736). Each local access interface (718, 720) may be embodied, for example, as a data communication bus that forms a data communications path between the compute resources (714, 716) in a particular blade (752, 754) and one or more storage resources (734, 736) within the same particular blade (752, 754), as well as any other microprocessors, FPGAs, or other computing devices required to carry out data communications between the compute resources (714, 716) in a particular blade (752, 754) and one or more storage resources (734, 736) within the same particular blade (752, 754).

In the example depicted in FIG. 10, each of the blades (752, 754) that include storage resources (734, 736) and compute resources (714, 716) can also include a remote access interface (722, 724) through which compute resources (748) on a remote blade (756) can access the local storage resources (734, 736) without utilizing the local compute resources (714, 716). Each remote access interface (722, 724) may be embodied, for example, as a data communications interface in each of the blades (752, 754) that enables an FPGA, microprocessor, or other form of computing device that is part of the storage resources (734, 736) in a particular blade (752, 754) to couple to a data communications network. In such an example, compute resources (714, 716, 748) on a remote blade (752, 754, 756) may send an instruction to write data to, or read data from, the storage resources (734, 736) in a different blade (752, 754) directly to microprocessor, or other form of computing device that is part of the storage resources (734, 736) in the different blade (752, 754). For example, compute resources (714, 748) on two of the blades (752, 756) may directly send an instruction to write data to, or read data from, the storage resources (736) in another blade (754) without utilizing the compute resources (716) on the targeted blade (754), compute resources (716, 748) on two of the blades (754, 756) may directly send an instruction to write data to, or read data from, the storage resources (734) in another blade (752) without utilizing the compute resources (714) on the targeted blade (752), and so on.

In the example depicted in FIG. 10, each of the blades (752, 754) that include storage resources (734, 736) and compute resources (714, 716) can also include a switching mechanism (728, 728) configured to provide access to the local storage resources (734, 736), where the switching mechanism (726, 728) is coupled to the local compute resources (714, 716) via the local access interface (718, 720) and the switching mechanism (726, 728) is coupled to the compute resources (714, 716, 748) on a remote blade (752, 754, 756) via a remote access interface (722, 724). For example, the switching mechanism (726) in one of the illustrated blades (752) may be coupled to the local compute resources (714) on the illustrated blade (752) via the local access interface (718) and the switching mechanism (726, 728) may also be coupled to the compute resources (716, 748) on a remote blade (754, 756) via a remote access interface (722) on the illustrated blade (752). Likewise, the switching mechanism (728) in another illustrated blade (754) may be coupled to its local compute resources (716) via the local access interface (720) and the switching mechanism (728) may also be coupled to the compute resources (714, 748) on a remote blade (752, 756) via a remote access interface (724) on the blade (754). In the example depicted in FIG. 10, each switching mechanism (726, 728) may be similar to the switching mechanisms described above with reference to FIG. 6.

In the example depicted in FIG. 10, each remote access interface (722, 724) may utilize a first data communications protocol and each local access interface (718, 720) may utilize a second data communications protocol. For each, the storage resources (734, 736) may be accessed by local compute resources (714, 716) via the local access interface (718, 720) by utilizing a PCIe data communications link whereas the storage resources (734, 736) may be accessed by compute resources (714, 716, 748) on a remote blade (752, 754, 756) via the remote access interface (722, 724) by utilizing an Ethernet data communications link.

In the example depicted in FIG. 10, each of the blades (752, 754) that include storage resources (734, 736) and compute resources (714, 716) can also include a first local power domain (710, 712) configured to deliver power to the local compute resources (714, 716). The first local power domain (710, 712) in each of the blades (752, 754) that include storage resources (734, 736) and compute resources (714, 716) may be embodied, for example, as a power supply, power distribution bus, and power interface to a host server, where the first power interface is configured to deliver power to one or more of the compute resources (714, 716) in the blade (752, 754). In the example depicted in FIG. 10, each of the blades (752, 754) that include storage resources (734, 736) and compute resources (714, 716) can also include a second local power domain (730, 732) configured to deliver power to the local storage resources (734, 736). The second local power domain (730, 732) in each of the blades (752, 754) that include storage resources (734, 736) and compute resources (714, 716) may be embodied, for example, as a power supply, power distribution bus, and power interface to a storage unit, where the second power domain is configured to deliver power to one or more of the storage resources (734, 736) in the blade (752, 754).

Readers will appreciate that, for each of the blades (752, 754) that include storage resources (734, 736) and compute resources (714, 716), the first local power domain (710, 712) and the second local power domain (730, 732) may be independently operated. The first local power domain (710, 712) and the second local power domain (730, 732) in a particular blade (752, 754) may be operated independently as the power interfaces within each power domain (710, 712, 730, 732) may be enabled or disabled independently, the distinct power supplies that provide power to each power domain (710, 712, 730, 732) may be enabled or disabled independently, the distinct power busses that are included in each power domain (710, 712, 730, 732) may be enabled or disabled independently, and so on. In such a way, the delivery of power to one or more compute resources (714, 716) may be enabled or disabled independently of the delivery of power to one or more storage resources (734, 736), and vice versa.

In the example depicted in FIG. 10, the storage resources (734, 736, 750) within at least one blade (752, 754, 756) may receive power via a remote access interface. As described above, the storage resources (734, 736, 750) within each blade (752, 754, 756) may be accessed via a remote access interface (722, 724, 760). Such remote access interface (722, 724, 760) can include an Ethernet link that enables a storage unit to couple to a data communications network. Power may therefore be delivered to the storage resources (734, 736, 750), for example, through the use of PoE techniques. In such a way, when a remote blade is accessing the storage resources (734, 736, 750) within a particular blade (752, 754, 758) via the remote access interface (722, 724, 760), the storage resources (734, 736, 750) may be powered using the remote access interface (722, 724, 760). In alternative embodiments, power may be provided to the storage resources (734, 736, 750) in different ways.

Figure 11:
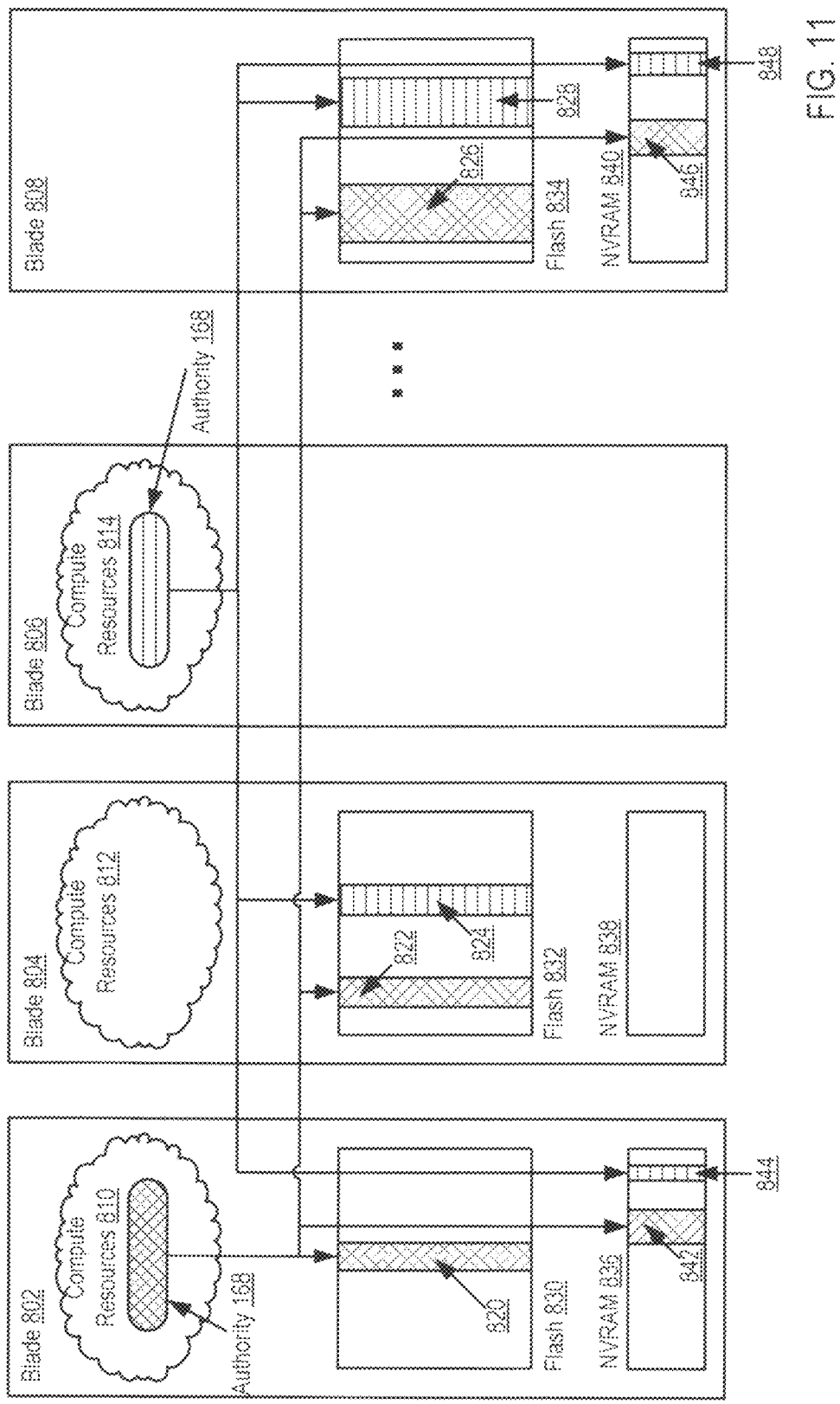
FIG. 11 sets forth a diagram of a set of blades useful in a storage system that supports independent scaling of compute resources and storage resources according to embodiments of the present disclosure.

For further explanation, FIG. 11 sets forth a diagram of a set of blades (802, 804, 806, 808) useful in a storage system that supports independent scaling of compute resources and storage resources according to embodiments of the present disclosure. Although blades will be described in greater detail below, the blades (802, 804, 806, 808) depicted in FIG. 11 may include compute resources (810, 812, 814), storage resources in the form of flash memory (830, 832, 834), storage resources in the form of non-volatile random access memory ('NVRAM') (836, 838, 840), or any combination thereof. In the example depicted in FIG. 11, the blades (802, 804, 806, 808) are of differing types. For example, one blade (806) includes only compute resources (814), another blade (808) includes only storage resources, depicted here as flash (834) memory and NVRAM (840), and two of the blades (802, 804) include compute resources (810, 812) as well as storage resources in the form of flash (830, 832) memory and NVRAM (836, 838). In such of an example, the blade (806) that includes only compute resources (814) may be referred to as a compute blade, the blade (808) that includes only storage resources may be referred to as a storage blade, and the blades (802, 804) that include both compute resources (810, 812) and storage resources may be referred to as a hybrid blade.

The compute resources (810, 812, 814) depicted in FIG. 11 may be embodied, for example, as one or more computer processors, as well as memory that is utilized by the computer processor but not included as part of general storage within the storage system. The compute resources (810, 812, 814) may be coupled for data communication with other blades and with external client systems, for example, via one or more data communication busses that are coupled to the compute resources (810, 812, 814) via one or more data communication adapters.

The flash memory (830, 832, 834) depicted in FIG. 11 may be embodied, for example, as multiple flash dies which may be referred to as packages of flash dies or an array of flash dies. Such flash dies may be packaged in any number of ways, with a single die per package, multiple dies per package, in hybrid packages, as bare dies on a printed circuit board or other substrate, as encapsulated dies, and so on. Although not illustrated in FIG. 11, an input output (I/O) port may be coupled to the flash dies and a direct memory access ('DMA') unit may also be coupled directly or indirectly to the flash dies. Such components may be implemented, for example, on a programmable logic device ('PLD') such as a field programmable gate array ('FPGA'). The flash memory (830, 832, 834) depicted in FIG. 11 may be organized as pages of a predetermined size, blocks that include a predetermined number of pages, and so on.

The NVRAM (836, 838, 840) depicted in FIG. 11 may be embodied, for example, as one or more non-volatile dual in-line memory modules ('NVDIMMs'), as one more DRAM dual in-line memory modules ('DIMMs') that receive primary power through a DIMM slot but are also attached to a backup power source such as a supercapacitor, and so on. The NVRAM (836, 838, 840) depicted in FIG. 11 may be utilized as a memory buffer for temporarily storing data that will be written to flash memory (830, 832, 834), as writing data to the NVRAM (836, 838, 840) may be carried out more quickly than writing data to flash memory (830, 832, 834). In this way, the latency of write requests may be significantly improved relative to a system in which data is written directly to the flash memory (830, 832, 834).

In the example method depicted in FIG. 11, a first blade (802) includes a first authority (168) that is executing on the compute resources (810) within the first blade (802) and a second blade (806) includes a second authority (168) that is executing on the compute resources (814) within the second blade (806). Each authority (168) represents a logical partition of control and may be embodied as a module of software executing on the compute resources (810, 812, 814) of a particular blade (802, 804, 806). Each authority (168) may be configured to control how and where data is stored in storage system. For example, authorities (168) may assist in determining which type of erasure coding scheme is applied to the data, authorities (168) may assist in determining where one or more portions of the data may be stored in the storage system, and so on. Each authority (168) may control a range of inode numbers, segment numbers, or other data identifiers which are assigned to data by a file system or some other entity.

Each authority (168) may operate independently and autonomously on its partition of each of the entity spaces defined within the system. Each authority (168) may serve as an independent controller over those spaces, each providing its own data and metadata structures, its own background workers, and maintaining its own lifecycle. Each authority (168) may, for example, allocate its own segments, maintains its own log/pyramid, maintain its own NVRAM, define its own sequence ranges for advancing persistent state, boot independently, and so on.

Readers will appreciate that every piece of data and every piece of metadata stored in the storage system is owned by a particular authority (168). Each authority (168) may cause data that is owned by the authority (168) to be stored within storage that is located within the same blade whose computing resources are supporting the authority (168) or within storage that is located on some other blade. In the example depicted in FIG. 11:

a. The authority (168) that is executing on the compute resources (810) within a first blade (802) has caused data to be stored within a portion (820) of flash (830) that is physically located within the first blade (802).

b. The authority (168) that is executing on the compute resources (810) within a first blade (802) has also caused data to be stored in a portion (842) of NVRAM (836) that is physically located within the first blade (802).

c. The authority (168) that is executing on the compute resources (810) within the first blade (802) has also caused data to be stored within a portion (822) of flash (832) on the second blade (804) in the storage system.

d. The authority (168) that is executing on the compute resources (810) within the first blade (802) has also caused data to be stored within a portion (826) of flash (834) and a portion (846) of NVRAM (840) on the fourth blade (808) in the storage system.

e. The authority (168) that is executing on the compute resources (814) within the third blade (802) has caused data to be stored within a portion (844) of NVRAM (836) that is physically located within the first blade (802).

f. The authority (168) that is executing on the compute resources (814) within the third blade (802) has also caused data to be stored within a portion (824) of flash (832) within the second blade (804).

g. The authority (168) that is executing on the compute resources (814) within the third blade (802) has also caused data to be stored within a portion (828) of flash (834) within the fourth blade (808).

h. The authority (168) that is executing on the compute resources (814) within the third blade (802) has also caused data to be stored within a portion (848) of NVRAM (840) within the fourth blade (808).

Readers will appreciate that many embodiments other than the embodiment depicted in FIG. 11 are contemplated as it relates to the relationship between data, authorities, and system components. In some embodiments, every piece of data and every piece of metadata has redundancy in the storage system. In some embodiments, the owner of a particular piece of data or a particular piece of metadata may be a ward, with an authority being a group or set of wards. Likewise, in some embodiments there are redundant copies of authorities. In some embodiments, authorities have a relationship to blades and the storage resources contained therein. For example, each authority may cover a range of data segment numbers or other identifiers of the data and each authority may be assigned to a specific storage resource. Data may be stored in a segment according to some embodiments of the present disclosure, and such segments may be associated with a segment number which serves as indirection for a configuration of a RAID stripe. A segment may identify a set of storage resources and a local identifier into the set of storage resources that may contain data. In some embodiments, the local identifier may be an offset into a storage device and may be reused sequentially by multiple segments. In other embodiments the local identifier may be unique for a specific segment and never reused. The offsets in the storage device may be applied to locating data for writing to or reading from the storage device.

Readers will appreciate that if there is a change in where a particular segment of data is located (e.g., during a data move or a data reconstruction), the authority for that data segment should be consulted. In order to locate a particular piece of data, a hash value for a data segment may be calculated, an inode number may be applied, a data segment number may be applied, and so on. The output of such an operation can point to a storage resource for the particular piece of data. In some embodiments the operation described above may be carried out in two stages. The first stage maps an entity identifier (ID) such as a segment number, an inode number, or directory number to an authority identifier. This mapping may include a calculation such as a hash or a bit mask. The second stage maps the authority identifier to a particular storage resource, which may be done through an explicit mapping. The operation may be repeatable, so that when the calculation is performed, the result of the calculation reliably points to a particular storage resource. The operation may take the set of reachable storage resources as input, and if the set of reachable storage resources changes, the optimal set changes. In some embodiments, a persisted value represents the current assignment and the calculated value represents the target assignment the cluster will attempt to reconfigure towards.

The compute resources (810, 812, 814) within the blades (802, 804, 806) may be tasked with breaking up data to be written to storage resources in the storage system. When data is to be written to a storage resource, the authority for that data is located as described above. When the segment ID for data is already determined, the request to write the data is forwarded to the blade that is hosting the authority, as determined using the segment ID. The computing resources on such a blade may be utilized to break up the data and transmit the data for writing to a storage resource, at which point the transmitted data may be written as a data stripe in accordance with an erasure coding scheme. In some embodiments, data is requested to be pulled and in other embodiments data is pushed. When compute resources (810, 812, 814) within the blades (802, 804, 806) are tasked with reassembling data read from storage resources in the storage system, the authority for the segment ID containing the data is located as described above.

The compute resources (810, 812, 814) within the blades (802, 804, 806) may also be tasked with reassembling data read from storage resources in the storage system. The compute resources (810, 812, 814) that support the authority that owns the data may request the data from the appropriate storage resource. In some embodiments, the data may be read from flash storage as a data stripe. The compute resources (810, 812, 814) that support the authority that owns the data may be utilized to reassemble the read data, including correcting any errors according to the appropriate erasure coding scheme, and forward the reassembled data to the network. In other embodiments, breaking up and reassembling data, or some portion thereof, may be performed by the storage resources themselves.

The preceding paragraphs discuss the concept of a segment. A segment may represent a logical container of data in accordance with some embodiments. A segment may be embodied, for example, as an address space between medium address space and physical flash locations. Segments may also contain metadata that enables data redundancy to be restored (rewritten to different flash locations or devices) without the involvement of higher level software. In some embodiments, an internal format of a segment contains client data and medium mappings to determine the position of that data. Each data segment may be protected from memory and other failures, for example, by breaking the segment into a number of data and parity shards. The data and parity shards may be distributed by striping the shards across storage resources in accordance with an erasure coding scheme.

The examples described above relate, at least to some extent, to chassis for use in a storage system that supports independent scaling of compute resources and storage resources, blades for use in storage systems that support independent scaling of compute resources and storage resources, and storage systems that support independent scaling of compute resources and storage resources. Readers will appreciate that the resources that are independently scaled, compute resources and storage resources, are those resources that are generally available to users of the storage system. For example, the storage resources that are independently scaled may be storage resources that a user of the storage system can use to persistently store user data. Likewise, the compute resources that are independently scaled may be compute resources that a user of the storage system can use to support the execution of applications, authorities, and the like.

Readers will appreciate that while the host servers described above with reference to FIGS. 5, 6, and 8 include memory, such memory is not considered to be part of the storage resources that are independently scaled. Such memory is included in the host server for the purpose of supporting the execution of instructions by a processor that is also included in the host server. Such memory is not, however, included in the host server for the purpose of expanding the amount of storage that a storage system that includes the blades depicted in FIGS. 5, 6, and 8 can make available to users of the storage system. As such, a compute blade is described above as lacking storage resources, in spite of the fact that the compute blade can include some form of memory that may be used to support the execution of computer program instructions by the compute resources in the compute blade.

Readers will similarly appreciate that while the storage units described above with reference to FIGS. 5, 6, and 7 include an ARM and an FPGA, such devices are not considered to be part of the compute resources that are independently scaled. Such devices are included in the storage units for the purpose of accessing storage in the storage units in much the same way that a memory controller accesses memory. Such devices are not, however, included in the storage units for the purpose of expanding the amount of computing resources that a storage system that includes the blades depicted in FIGS. 5, 6, and 7 can make available to users of the storage system. As such, a storage blade is described above as lacking compute resources, in spite of the fact that the storage blade can include some devices that may be used to support the execution of computer program instructions that read and write data to attached storage.

Figure 12:
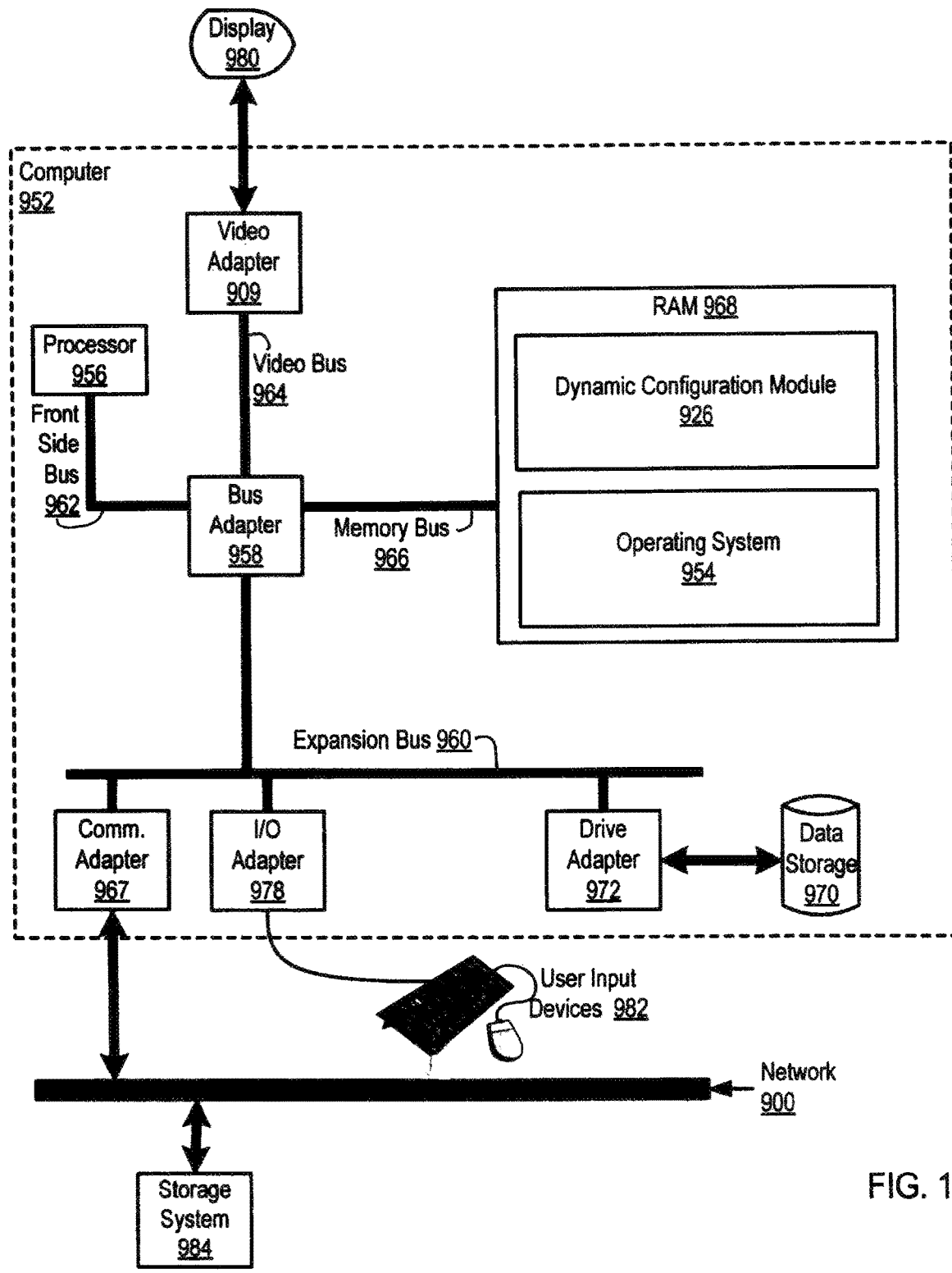
FIG. 12 sets forth a block diagram of automated computing machinery comprising an example computer useful in supporting independent scaling of compute resources and storage resources according to embodiments of the present disclosure.

For further explanation, FIG. 12 sets forth a block diagram of automated computing machinery comprising an example computer (952) useful in supporting independent scaling of compute resources and storage resources according to embodiments of the present disclosure. The computer (952) of FIG. 12 includes at least one computer processor (956) or "CPU" as well as random access memory ("RAM")

(968) which is connected through a high speed memory bus (966) and bus adapter (958) to processor (956) and to other components of the computer (952). Stored in RAM (968) is a dynamic configuration module (926), a module of computer program instructions for useful in supporting independent scaling of compute resources and storage resources according to embodiments of the present disclosure. The dynamic configuration module (926) may be configured for supporting independent scaling of compute resources and storage resources by performing a variety of support functions such as, for example, detecting the insertion of a blade into a chassis through the receipt of one or more device registration messages, admitting a blade that has been powered up into the storage system, logically removing a blade that has been powered down from the storage system, maintaining information identifying available and unavailable resources in the storage system, and so on.

Also stored in RAM (968) is an operating system (954). Operating systems useful in computers configured for supporting independent scaling of compute resources and storage resources according to embodiments described herein include UNIX™, Linux™, Microsoft XP™, AIX™, IBM's i5/OS™, and others as will occur to those of skill in the art. The operating system (954) and dynamic configuration module (926) in the example of FIG. 9 are shown in RAM (968), but many components of such software typically are stored in non-volatile memory also, such as, for example, on a disk drive (970).

The example computer (952) of FIG. 12 also includes disk drive adapter (972) coupled through expansion bus (960) and bus adapter (958) to processor (956) and other components of the computer (952). Disk drive adapter (972) connects non-volatile data storage to the computer (952) in the form of disk drive (970). Disk drive adapters useful in computers configured for supporting independent scaling of compute resources and storage resources according to embodiments described herein include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (952) of FIG. 12 includes one or more input/output ("I/O") adapters (978). I/O adapters implement user-oriented input/output through, for example, software drivers and computer hardware for controlling output to display devices such as computer display screens, as well as user input from user input devices (982) such as keyboards and mice. The example computer (952) of FIG. 9 includes a video adapter (909), which is an example of an I/O adapter specially designed for graphic output to a display device (980) such as a display screen or computer monitor. Video adapter (909) is connected to processor (956) through a high speed video bus (964), bus adapter (958), and the front side bus (962), which is also a high speed bus.

The example computer (952) of FIG. 12 includes a communications adapter (967) for data communications with a storage system (984) as described above and for data communications with a data communications network (900). Such data communications may be carried out serially through RS-232 connections, through external buses such as a Universal Serial Bus ('USB'), a Fibre Channel data communications link, an Infiniband data communications link, through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for supporting independent scaling of compute resources and storage resources according to embodiments described herein include Ethernet (IEEE 802.3) adapters for wired data communications, Fibre Channel adapters, Infiniband adapters, and so on.

The computer (952) may implement certain instructions stored on RAM (968) for execution by processor (956) for supporting independent scaling of compute resources and storage resources. In some embodiments, dynamically configuring the storage system to facilitate independent scaling of resources may be implemented as part of a larger set of executable instructions. For example, the dynamic configuration module (926) may be part of an overall system management process.

Figure 13A:
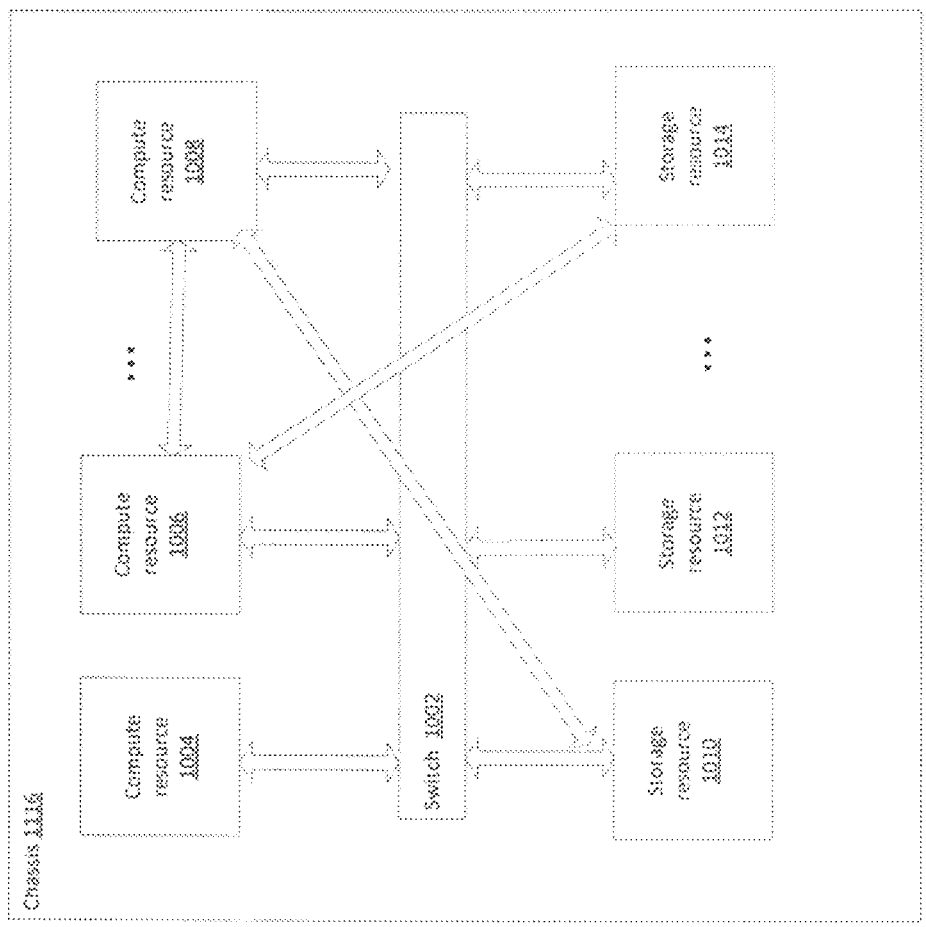
FIG. 13A sets forth a diagram of a single chassis storage system that has a switch for direct network-connected communication among computing resources and storage resources of the storage system according to embodiments of the present disclosure.

FIG. 13A sets forth a diagram of a single chassis 1116 storage system that has a switch 1002 for direct network-connected communication among computing resources 1004, 1006, 1008 and storage resources 1010, 1012, 1014 of the storage system according to embodiments of the present disclosure. The switch 1002 can be integrated with the chassis 1116, or separate from the chassis 1116, and is implemented as a network switch, an Ethernet switch, switch fabric, a switch matrix, a switch module, a fabric module or multiple switches in various embodiments. Multiple blades, which can be heterogeneous or homogeneous and include compute-only blades, storage-only blades or hybrid compute and storage blades in various combinations, populate the chassis 1116.

Each compute resource 1004, 1006, 1008 and each storage resource 1010, 1012, 1014 in the blades is direct network-connected to the switch 1002, for example without bridging to PCIe (peripheral component interconnect express) or other bridging or routing to other networks to communicate with a compute resource 1004, 1006, 1008 or a storage resource 1010, 1012, 1014. That is, the switch 1002 direct network-connects processors or compute resources and solid-state storage memory or storage resources in the storage system. Each compute resource 1004, 1006, 1008 can communicate with each other compute resource 1004, 1006, 1008 and with each storage resource 1010 1012, 1014, through the switch 1002. Each storage resource 1010, 1012, 1014 can communicate with each other storage resource 1010, 1012, 1014 and with each compute resource 1004, 1006, 1008, through the switch 1002. In some embodiments, communication uses Ethernet protocol, or other network protocol.

Figure 13B:
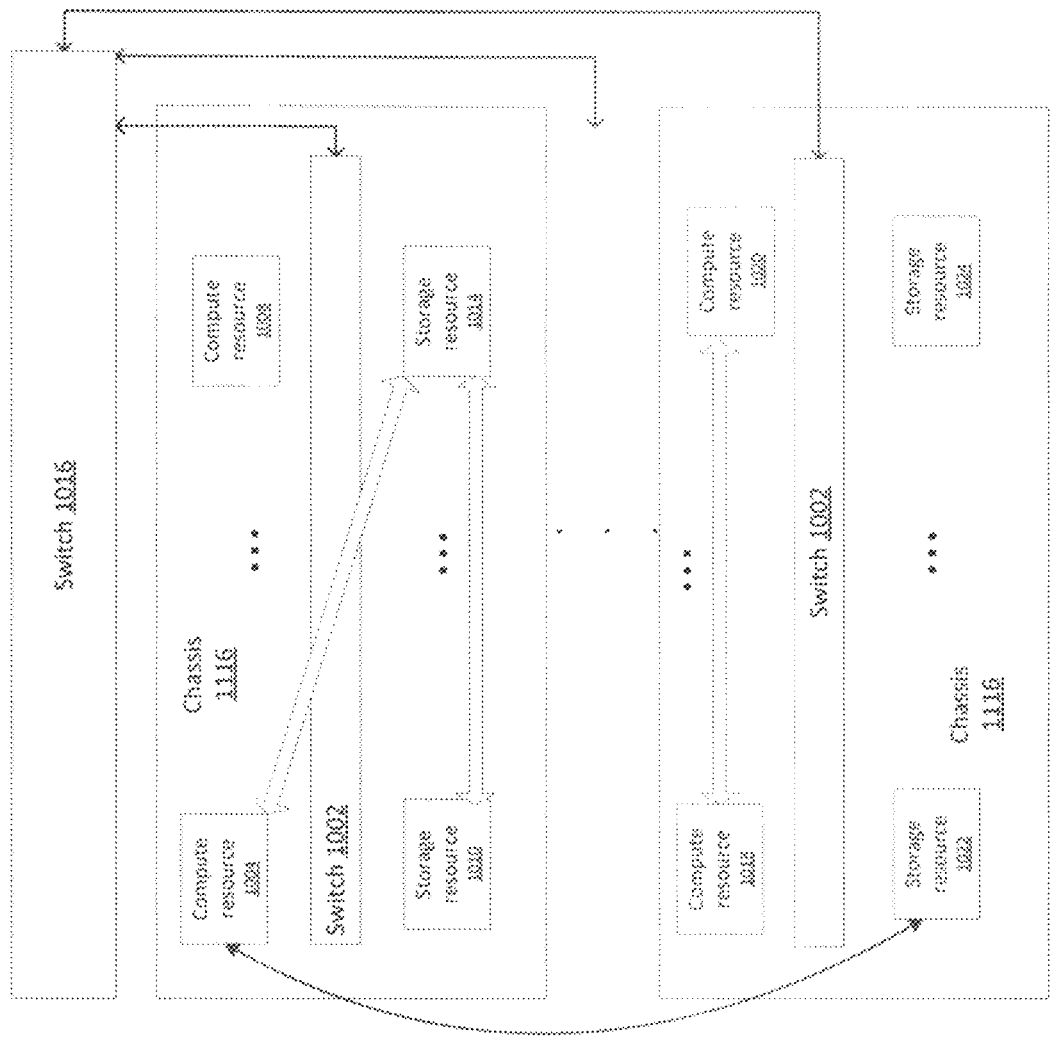
FIG. 13B sets forth a diagram of a multi-chassis storage system that has a switch for direct network-connected communication among compute resources and storage resources of the storage system according to embodiments of the present disclosure.

FIG. 13B sets forth a diagram of a multi-chassis 1116 storage system that has a switch 1002, 1016 for direct network-connected communication among compute resources 1004, 1008, 1018, 1020 and storage resources 1010, 1014, 1022, 1024 of the storage system according to embodiments of the present disclosure. Multiple chassis 1116 can be arranged on one or more racks or otherwise coupled by a switch 1016, such as a top of rack switch or other switch such as described with reference to FIG. 10A. Each chassis 1116 has multiple blades in heterogeneous or homogeneous arrangement with compute resources and storage resources, in various embodiments such as described with reference to FIG. 10A. The combination of the switches 1002 in each of the multiple chassis 1116 and the switch 1016 coupling the multiple chassis 1116 act as a switch 1002, 1016 that direct network-connects processors or compute resources and solid-state storage memory or storage resources in the storage system. In further embodiments, the switch 1002, 1016 is an integrated switch that both couples multiple chassis 1116 and couples compute resources 1004, 1008, 1018, 1020 and storage resources 1010, 1014, 1022, 1024 in the multiple chassis 1116.

As in single chassis embodiments, each compute resource 1004, 1008, 1018, 1020 can communicate with each other compute resource 1004, 1008, 1018, 1020 and with each storage resource 1010, 1014, 1022, 1024, through the switch 1002, 1016. Each storage resource 1010, 1014, 1022, 1024 can communicate with each other storage resource 1010, 1014, 1022, 1024 and with each compute resource 1004, 1008, 1018, 1020, through the switch 1002, 1016. In some embodiments, communication uses Ethernet protocol, or other network protocol.

Switch 1002, in single chassis storage systems such as shown in FIG. 13A, and switch 1002, 1016, in multi-chassis storage systems such as shown in FIG. 13B, support disaggregated compute resources and storage resources in the storage system. A storage resource and a computer resource do not need to be in the same blade, or even in the same chassis 1116 when communicating with each other. There is little or no penalty in terms of communication delay or latency, when communicating between any two compute resources or storage resources, or any compute resource and any storage resource, regardless of location in the storage system. All such resources can be treated as being approximately equally close, without need of aggregating resources in a given blade.

Disaggregation of compute resources and storage resources supports storage system expansion and scalability, because read and write accesses, data striping and all forms of communication among resources do not suffer worsening delays as the system grows. At most, there is a small communication delay penalty when going from a single chassis system to a multi-chassis system, as a result of the additional layer of switching in some embodiments, but no penalty for adding blades to either system, and no penalty for adding more chassis to a multi-chassis system.

Figure 14C:
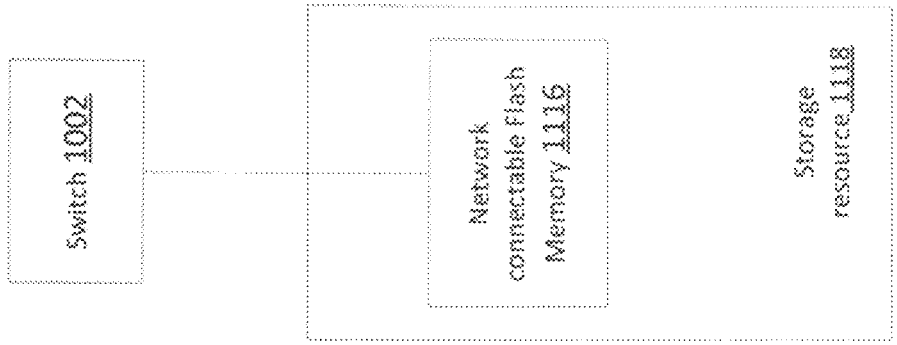
FIG. 14C sets forth a diagram of a storage resource for embodiments of a storage system, with network-connectable flash memory connected to a switch such as shown in FIGS. 10A and 10B.
Figure 14B:
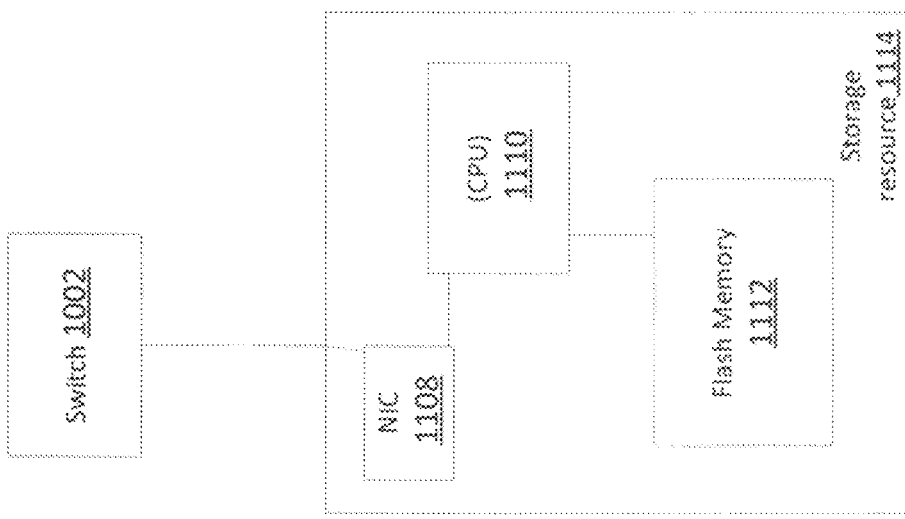
FIG. 14B sets forth a diagram of a storage resource for embodiments of a storage system, with flash memory, a NIC (network interface card or network interface controller) and a packet processing control processor, with the NIC connected to a switch such as shown in FIGS. 10A and 10B.
Figure 14A:
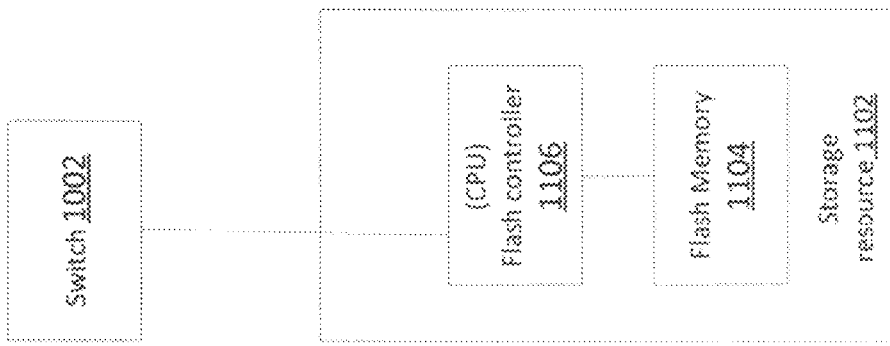
FIG. 14A sets forth a diagram of a storage resource for embodiments of a storage system, with flash memory and a flash controller connected to a switch such as shown in FIGS. 10A and 10B.

FIG. 14A sets forth a diagram of a storage resource 1102 for embodiments of a storage system, with flash memory 1104 and a flash controller 1106 connected to a switch 1002 such as shown in FIGS. 13A and 13B. A suitable example of a flash controller 1106 is shown in FIGS. 5-7, with an ARM 516 (processor or CPU) and FPGA 520, and other flash controllers are readily devised. Further versions with other types of solid-state storage memory and other types of controller suitable to those memories are readily devised. The flash controller 1106 manages the flash memory 1104 and communicates with other resources using an appropriate network protocol through the switch 1002, thus supporting direct network-connection of the storage resource 1102. This version of a storage resource 1102 could be in a storage-only blade, or a hybrid compute and storage blade, in various embodiments.

FIG. 14B sets forth a diagram of a storage resource 1114 for embodiments of a storage system, with flash memory 1112, a NIC (network interface card or network interface controller) 1108 and a packet processing control processor 1110, with the NIC 1108 connected to a switch 1002 such as shown in FIGS. 13A and 13B. The NIC 1108 is implemented on a card, one or more integrated circuits, or as a module in an integrated circuit such as a full custom chip, ASIC or FPGA, in various embodiments, and can be local to the flash memory 1112 or remote from the flash memory 1112. A packet processing control processor 1110 connects to the flash memory 1112 and composes and decomposes packets with the NIC 1108, so that the flash memory 1112 can communicate over the switch 1002 with other resources in the storage system. As with the version of a storage resource 1102 shown in FIG. 11A, this version supports direct network-connection of the storage resource 1102 and could be in a storage-only blade or a hybrid compute and storage blade.

FIG. 14C sets forth a diagram of a storage resource 1118 for embodiments of a storage system, with network-connectable flash memory 1116 connected to a switch 1002 such as shown in FIGS. 13A and 13B. Network-connectable flash memory 1116 has a NIC 1108, flash controller 1106 or other module for network connection on chip or in package, in some embodiments. This supports direct network-connection of the storage resource 1118, and could be in a storage-only blade or a hybrid compute and storage blade.

Figure 15:
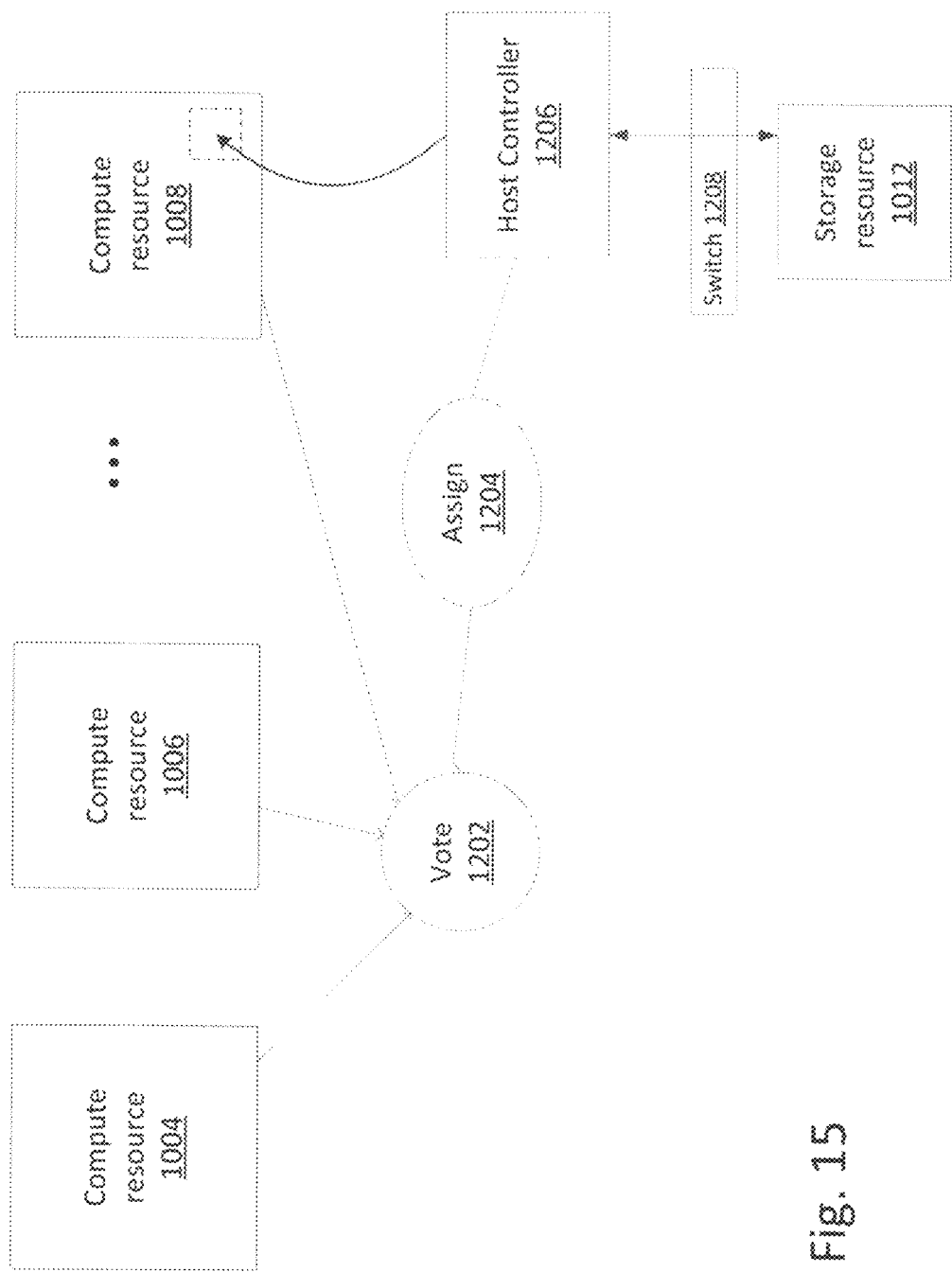
FIG. 15 sets forth a diagram depicting compute resources voting to assign a host controller for a storage resource to one of the compute resources.

FIG. 15 sets forth a diagram depicting compute resources 1004, 1006, 1008 voting to assign a host controller 1206 for a storage resource 1012 to one of the computing resources 1008. The host controller 1206 does not need to be assigned to a compute resource 1008 that has the storage resource 1012 on the same blade. That is, the host controller 1206 could be assigned to a compute resource 1008 on a different blade from the storage resource 1012 that is controlled by the host controller 1206, for example two hybrid blades, a compute-only blade and a storage-only blade, a hybrid blade and a storage-only blade, or a compute-only blade and a hybrid blade. Or the host controller 1206 could be assigned to a compute resource 1008 on the same blade that has the storage resource 1012 corresponding to the host controller 1206, e.g., a hybrid blade.

Various voting mechanisms and communication for voting are readily devised in keeping with the teachings herein. In some embodiments, each storage resource has an assigned host controller, in the compute resources. There could be zero, one, or more than one host controller on a given blade, in various embodiments, and host controllers could be transferred, reassigned to another blade, or replaced as resources are shifted or blades are added to or removed from the storage system, or a failure occurs. This ability to hold a vote 1202 and assign 1204 the host controller 1206 to any of a number of available compute resources supports disaggregated compute resources and storage resources in the storage system, because the storage memory is not required to be aggregated with the host controller that is managing the storage memory or processor(s) that are communicating with the storage memory for any specific communication. Host controller and corresponding storage memory are not required to be in the same blade, or even in the same chassis. In FIG. 12, the host controller 1206, no matter which compute resource 1004, 1006, 1008 and blade is assigned to have the host controller 1206, communicates with a corresponding storage resource 1012 through the switch 1208.

Figure 16:
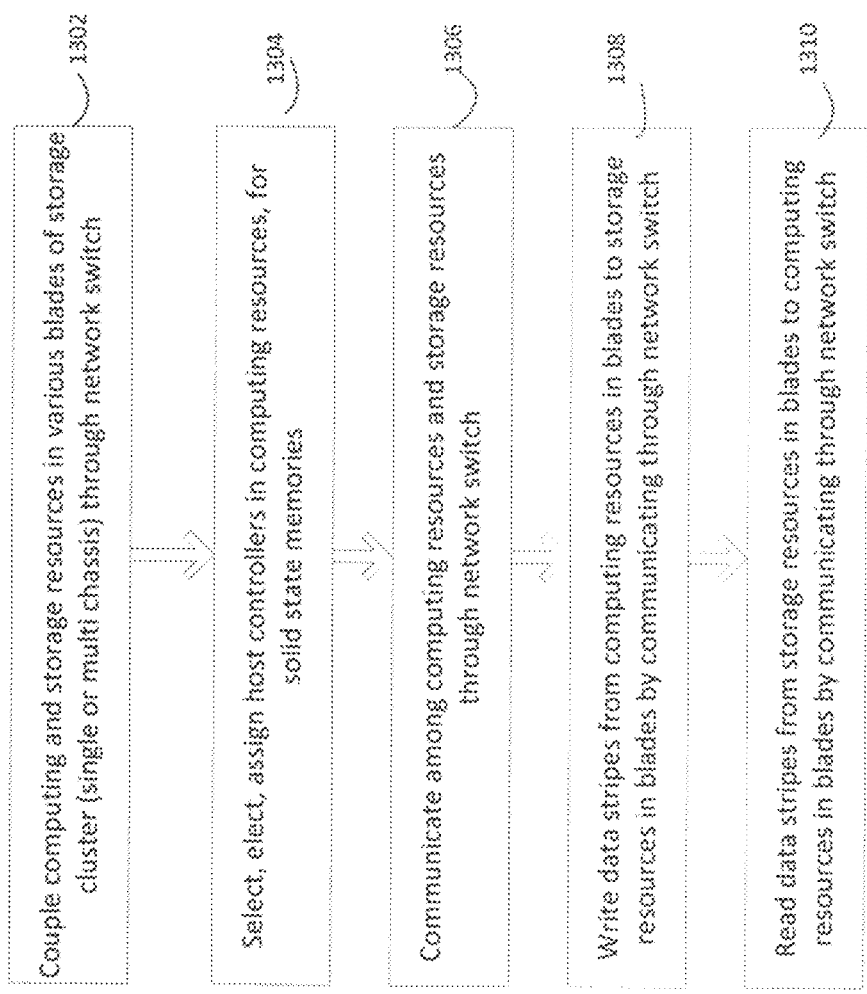
FIG. 16 is a flow diagram of a method of communicating in a storage system that has disaggregated compute resources and storage memory, which can be practiced by embodiments of storage systems described herein and variations thereof.

FIG. 16 is a flow diagram of a method of communicating in a storage system that has disaggregated compute resources and storage memory, which can be practiced by embodiments of storage systems described herein and variations thereof. The method can be practiced by various processors in the computing resources and storage resources in embodiments of storage systems. In an action 1302, computing resources and storage resources in various blades of a storage cluster are coupled through a network switch. The storage cluster could be single or multi chassis, and the blades could be homogeneous or heterogeneous. In an action 1304, compute resources cooperate to select, elect and/or assign host controllers in the computing resources, for the solid-state storage memories. Each host controller communicates with and manages a corresponding solid-state storage memory, but the host controller and corresponding solid-state storage memory are not required to be on the same blade (although they can be so).

In an action 1306 of FIG. 16, computing resources and storage resources communicate with each other through the network switch. For example this communication could use Ethernet protocol. Communication can be among resources in a single chassis, or among resources in multiple chassis. In an action 1308, data stripes are written from computing resources and blades to storage resources in blades, by communication through the network switch. The storage resources have solid-state storage memories, in various embodiments. In an action 1310, data stripes are read from storage resources in the blades to computing resources in the blades, by communication through the network switch. Further embodiments of the method are readily devised, including variations with specific communications, specific resources, and various types of switches, blades, compute resources and storage resources as described herein for embodiments of storage systems.

It will be further understood from the foregoing description that modifications and changes may be made in various embodiments of the present disclosure without departing from its true spirit. The descriptions in this specification are for purposes of illustration only and are not to be construed in a limiting sense.

What is claimed is:

1. A storage cluster, comprising:
a plurality of blades coupled as the storage cluster, each of at least a subset of the plurality of blades having solid-state storage drives therein, at least one of the plurality of blades having varying amounts of differing capacities of solid state storage drives, a respective solid state storage drive comprising a respective controller; and
a switch that direct network-connects a plurality of processors, as compute resources in the plurality of blades, and the solid-state storage drive in each of the at least a subset of the plurality of blades, wherein at least one of the plurality of blades, distinct from the subset of the plurality of blades, has independent local compute resources and independent local storage resources and the at least one of the plurality of blades has a local access interface through which the independent local compute resources can access the independent local storage resources, and a remote access interface through which the compute resources on further blades can access the independent local storage resources of the at least one of the plurality of blades.

2. The storage cluster of claim 1, wherein the plurality of blades comprises a homogeneous set of hybrid compute and storage blades.

3. The storage cluster of claim 1, wherein the plurality of blades comprises a heterogeneous mix of compute-only blades, storage-only blades or hybrid compute and storage blades.

4. The storage cluster of claim 1, wherein the at least one of the plurality of blades includes a plurality of authorities, each of the plurality of authorities controlling where data owned by respective authority is stored.

5. The storage cluster of claim 1, further comprising:
the plurality of blades configurable to have in the compute resources a plurality of host controllers, for the solid-state storage drives, wherein having the compute resources in the solid-state storage drives disaggregated in the storage cluster comprises each of the plurality of host controllers being assignable or transferable to a one of the plurality of blades independent of whether the one of the plurality of blades has on the blade a corresponding solid-state storage drive that is controlled by the host controller.

6. The storage cluster of claim 1, further comprising:
the plurality of blades configurable to have Ethernet communication among the plurality of processors and the solid-state storage drives, through the switch and direct network connection to each of the plurality of processors and the solid-state storage drives, without PCIe (peripheral component interconnect express).

7. The storage cluster of claim 1, wherein the plurality of blades are internally and externally connected through a PCIe (peripheral component interconnect express) connection.

8. The storage cluster of claim 1, wherein at least one of the blades having solid-state storage drives therein comprises:
flash memory; and
a NIC (network interface card or network interface controller), coupled to the flash memory and direct network-connected to the switch.

9. The storage cluster of claim 1, wherein at least one of the blades having solid-state storage drives therein comprises:
flash memory; and
a flash memory controller connected to the flash memory and direct-network connected to the switch.

10. A storage, comprising:
a plurality of blades having solid-state storage drives in at least a subset of the plurality of blades, at least one of the plurality of blades having varying amounts of differing capacities of solid state storage drives, a respective solid state storage drive comprising a respective controller; and
a switch, with the solid-state storage drives in the at least a subset of the plurality of blades direct network-connected to the switch, and a plurality of processors, as compute resources in the plurality of blades direct network-connected to the switch such that the compute resources and the solid-state storage drives are disaggregated in the storage system, and wherein at least one of the plurality of blades, distinct from the subset of the plurality of blades, has independent local compute resources and independent local storage resources and the at least one of the plurality of blades has a local access interface through which the independent local compute resources can access the independent local storage resources, and a remote access interface through which the compute resources on further blades can access the independent local storage resources of the at least one of the plurality of blades.

11. The storage system of claim 10, wherein:
the plurality of blades comprises a homogeneous set of hybrid compute and storage blades or a heterogeneous mix of compute-only blades having one or more processors and no solid-state storage drives, storage-only blades each having solid-state storage drives or hybrid compute and storage blades each having one or more processors and solid-state storage drives.

12. The storage system of claim 10, wherein the compute resources in the solid-state storage drives are disaggregated in the storage system comprises:

each of the plurality of processors able to communicate with each of the solid-state storage drives in the at least a subset of the plurality of blades through the switch, using Ethernet protocol.

13. The storage system of claim 10, wherein the compute resources in the solid-state storage drives are disaggregated in the storage system comprises:
   each of the plurality of blades that has one or more of the plurality of processors selectable to have a host controller for one of the solid-state storage drives in the at least a subset of the plurality of blades without requiring the host controller be on a same blade as the one of the solid-state storage drives.

14. The storage system of claim 10, wherein the at least one of the plurality of blades includes a plurality of authorities, each of the plurality of authorities controlling where data owned by respective authority is stored.

15. A method, comprising:
   communicating from a processor in a first blade of a storage cluster, through a switch, to a solid-state storage drives in a second blade of the storage cluster, wherein the switch direct network-connects a plurality of processors as compute resources in a plurality of blades of the storage cluster to solid-state storage drives in the plurality of blades, at least one of the plurality of blades having varying amounts of differing capacities of solid state storage drives, a respective solid state storage drive comprising a respective controller, and wherein at least one of the plurality of blades, distinct from the first and second blades, has independent local compute resources and independent local storage resources and the at least one of the plurality of blades has a local access interface through which the independent local compute resources can access the independent local storage resources, and a remote access interface through which the compute resources on further blades can access the independent local storage resources of the at least one of the plurality of blades; and
   communicating from a solid-state storage drive in a third blade of the storage cluster, through the switch, to a processor in a fourth blade of the storage cluster.

16. The method of claim 15, wherein the communicating from the processor in the first blade of the storage cluster, through the switch, to the solid-state storage drive in the second blade of the storage cluster comprises one of communicating to Ethernet-connectable flash memory in the second blade of the storage cluster or communicating through a NIC (network interface card or network interface controller) to flash memory in the second blade of the storage cluster.

17. The method of claim 15, further comprising:
   electing, selecting or assigning a plurality of host controllers for the solid-state storage drives to the compute resources, wherein the storage system that has disaggregated compute resources and storage drives comprises the electing, selecting or assigning of each of the plurality of host controllers to a compute resource is independent of whether the solid-state storage drives controlled by a host controller is on a same blade as the host controller.

18. The method of claim 15, wherein the at least one of the plurality of blades includes a plurality of authorities, each of the plurality of authorities controlling where data owned by respective authority is stored.

19. The method of claim 15, wherein the plurality of blades are internally and externally connected through a PCIe (peripheral component interconnect express) connection.

20. The method of claim 15, wherein:
   the communicating from the processor in the first blade comprises a portion of a first data stripe being written; and
   the communicating from the solid-state storage in the third blade comprises a portion of a second data stripe being read.

* * * * *